United States Patent [19]
Zanders

[11] Patent Number: 5,258,721
[45] Date of Patent: Nov. 2, 1993

[54] RING SIGNAL DETECTION CIRCUIT

[75] Inventor: Gary V. Zanders, Dallas, Tex.

[73] Assignee: Dallas Semiconductor Corp., Dallas, Tex.

[21] Appl. No.: 573,413

[22] Filed: Aug. 27, 1990

[51] Int. Cl.$^5$ .......................... H03K 9/06; H03D 3/00
[52] U.S. Cl. ..................... 328/138; 328/133; 307/522; 307/525; 377/28; 377/107
[58] Field of Search .............. 328/133, 134, 138; 307/525, 526, 522; 377/28, 47, 107

[56] References Cited
U.S. PATENT DOCUMENTS

| | | | |
|---|---|---|---|
| 4,047,114 | 9/1977 | Lane et al. | 328/138 |
| 4,123,704 | 10/1978 | Johnson | 328/134 |
| 4,344,038 | 8/1982 | Streeter | 328/138 |
| 4,737,984 | 4/1988 | Brown | 328/138 |
| 4,785,251 | 11/1988 | Akiyama et al. | 307/526 |

FOREIGN PATENT DOCUMENTS 0107626  6/1984  Japan .................... 307/525

Primary Examiner—Timothy P. Callahan
Attorney, Agent, or Firm—Worsham, Forsythe, Sampels & Wooldridge

[57] ABSTRACT

A telephone network interface integrated circuit with digitally based loop current detection and digitally based ring signal detection. The ring signal detection includes discrimination with a cutoff frequency of about 13 Hz to distinguish ring signals from dialing signals. The discrimination includes filtration followed by triggering an oscillator for one time period and checking whether the number of oscillations exceeds a threshold.

6 Claims, 16 Drawing Sheets

RING SIGNAL DETECTION CIRCUIT

CROSS-REFERENCE TO RELATED APPLICATIONS

Copending U.S. patent application Ser. No. 07/573,411, filed Aug. 27, 1990, discloses related subject matter and is assigned to the assignee of this application.

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

BACKGROUND AND SUMMARY OF THE INVENTIONS

The present invention relates to electronic devices, and, more particularly, to semiconductor devices useful in telecommunications.

A trend in equipment maintenance is to remote maintenance via telephone lines. Teleserviced equipment can be monitored around the clock in order to pinpoint problems before machinery breaks down. Anomalies may be automatically called in to a service center, and with the aid of diagnostic programs and a history file intelligent troubleshooting may be performed via the global telephone network. For example, consider the servicing problem encountered by manufacturers of factory robots. When a robot malfunctions, a whole assembly line can go down, and the robot manufacturer typically must quickly dispatch a highly trained technician to a site in another city with no guarantee of when the problem will be isolated and fixed. Not only does this incur travel costs; it also wastes the time and money of the robot user as his assembly line remains idle. But with teleservicing the robot can be interrogated remotely using a modem connection and a service manager computer. By running remote diagnostics over the dial-up telephone network, the robot's problem might be quickly identified and repaired without the need for human intervention. Perhaps the robot's software was an early revision with subsequently discovered bug; in such a case teleservicing enables instant, automated reloading of a new software version in the remote robot. In addition teleservicing can perform preventive maintenance: equipment can be automatically monitored and queried at times of low telephone use to verify correct operation.

Teleservicing can also mean the automated retrieval of information over the telephone. For example, an automated literature distribution system could use digitized high-fidelity speech to guide a human caller through a DTMF-controlled menu for selection of graphics information to be later transmitted to the caller's FAX machine. Such an application would require DTMF detection, digital speech playback, modem data transmission, and FCC-approved telephone line interfacing.

A problem of teleservicing is the number of telephone lines needed for a system with many remote sites to monitor and service. The present invention provides for detection of loop current changes in the telephone line. Such a detector may be incorporated into remote equipment; and this would permit the equipment to unobtrusively use already existing telephone lines. That is, if a remote piece of equipment is transmitting or receiving information on a telephone line and if someone picks up a telephone handset to make a call on the same telephone line, then the loop current drops and the piece of equipment can terminate its transmission and signal its host to also terminate transmission within a fraction of a second and without any apparent impact of the person attempting to make a call. In this manner multiple pieces of equipment can share a telephone line with a priority user and be teleserviced without any influence on the priority user's access to the telephone line. Preferred embodiments include a loop current detector that digitally stores sampled loop current, and thus makes the value available for use or monitoring by a teleservicing host.

BRIEF DESCRIPTION OF THE DRAWINGS

The present invention will be described with reference to the accompanying drawings, which show important sample embodiments of the invention and which are incorporated in the specification hereof by reference, wherein:

FIG. 6b is a timing for the circuitry of FIG. 6a;

DESCRIPTION OF THE PREFERRED EMBODIMENTS

The numerous innovative teachings of the present application will be described with particular reference to the presently preferred embodiments, wherein these innovative teachings are advantageously applied to the particular problems of telephone communications. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1A:
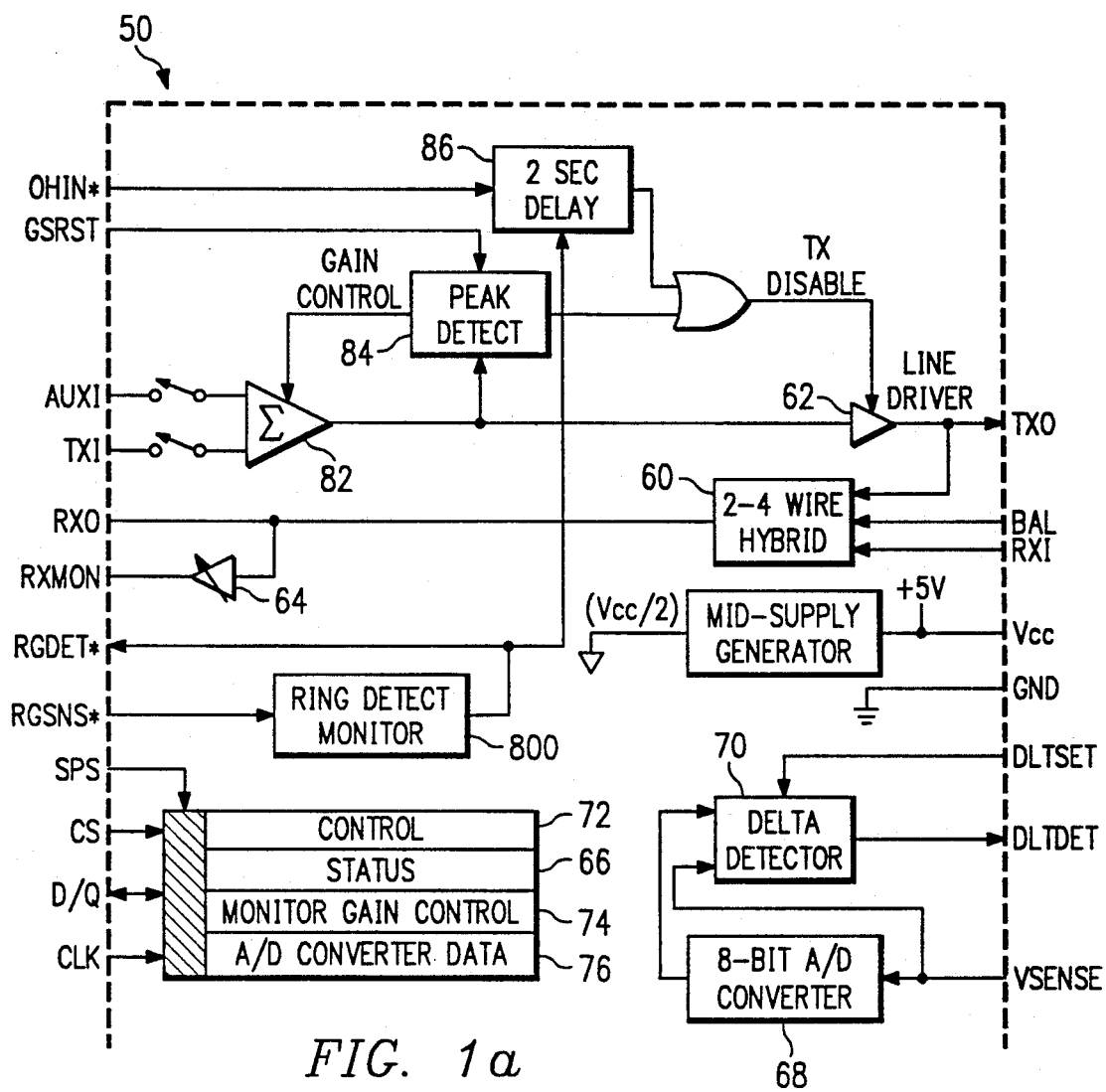
FIG. 1a is a schematic diagram of a first preferred embodiment circuit.
Figure 1B:
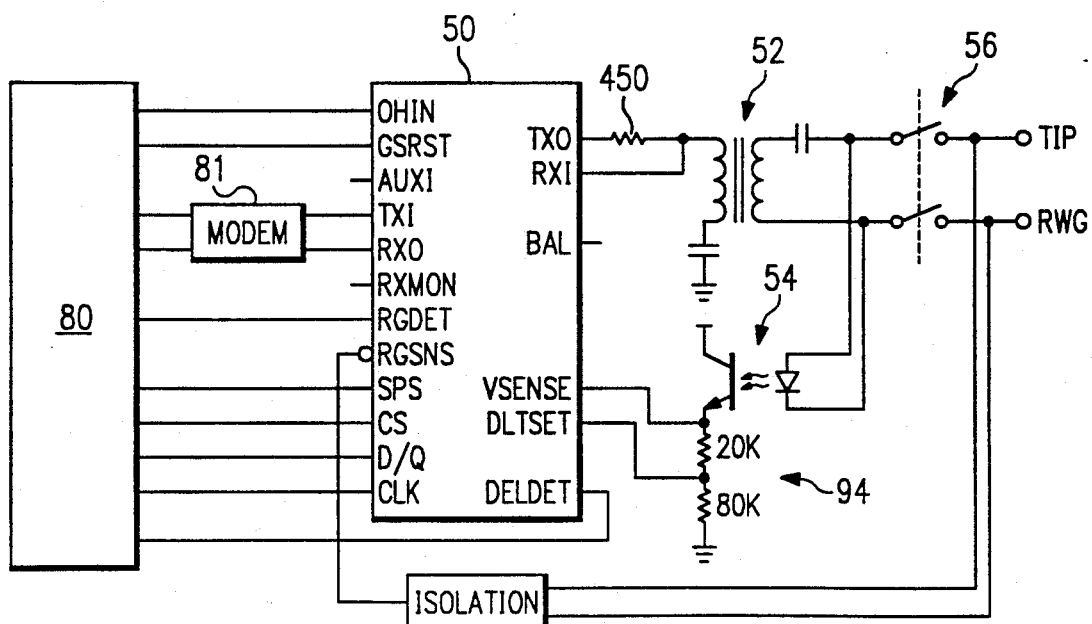
FIG. 1b is a schematic diagram of the first preferred embodiment as part of an interface with the telephone network.

FIG. 1a is a schematic block diagram of a first preferred embodiment integrated circuit, generally denoted with reference numeral 50, adapted for use in a voice and data interface with the public switched telephone network, and FIG. 1b schematically illustrates a complete interface using circuit 50 as connected between a smart sensor 80 with modem 81 and the telephone network. This interface provides a Data Access Arrangement with the telephone network and essentially consists of circuit 50 plus coupling transformer 52, optocoupler 54, and off-hook relay 56. Circuit 50 is a CMOS monolithic device that integrates many of the functions required by FCC for interfacing voice and data to the telephone network. Circuit 50 includes integral 2- to 4-wire converter or hybrid circuit 60 which isolates transmit and receive signals for use with a telephone coupling transformer 52. The transmit output 62 is specifically designed to drive telephone line impedances with low distortion using a single +5 volt supply. Voice and data signals can be multiplexed under software control to feed the transmit output. Automatic power limiting and a 2-second billing delay are included in the transmit path in order to meet FCC Part 68 requirements.

The receive section of circuit 50 is split into two paths. One path feeds the RXO output which is normally connected to the input of a modem or FAX device. The other path is routed to gain-programmable op-amp 64 which then feeds the RXMON output. This output can be used to drive an external speaker or handset, although it to can also be used with modem devices.

The ring detection circuit can take the raw output of an external optocoupled ring sensor 54 and process it into a glitchless square wave that corresponds to the ring burst duty cycle. Ring detection is reported at both the RGDET\ pin and in the Status Register 66.

An on-board 8-bit analog-to-digital (A/D) converter 68 is used to digitize and process external low-frequency signals such as loop current, receive power level, or analog sensor outputs. Conversion samples are accessible through the serial port. The conversion time is typically 80 usec. Circuit 50 also includes a Delta Detector circuit 70 that optionally reports when the input signal to the A/D converter 68 has changed by a certain percentage.

Control of circuit 50 is accomplished using either the software or hardware modes. In the hardware mode (SPS=0), device operation is controlled by tying certain pins high or low. The software mode (SPS=1) uses a 3-wire serial interface for accessing internal registers 66, 72, 74, and 76. These registers provide control and monitoring information for use by external microcontroller or microprocessor 80 and over the telephone line to a remote host computer.

A power-down mode is included for reducing power dissipation in low-power applications. The power-down mode is controlled by the PD bit in the Control Register 72. The power-down mode is exited by either clearing the PD bit or by a high-to-low transition on RGSNS\.

Figure 2:
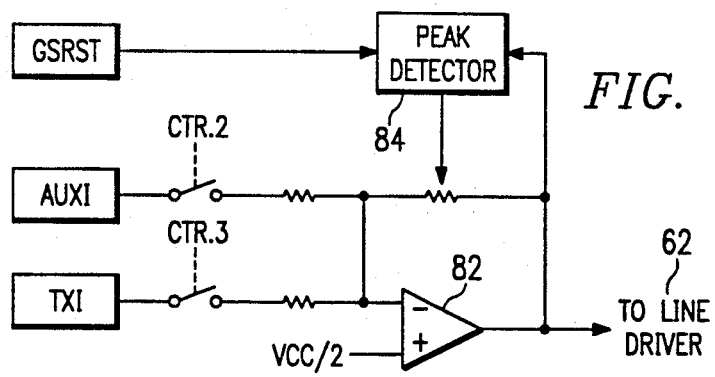
FIGS. 2-4 are schematics of various portions of the first preferred embodiment circuit.

A block diagram of the transmit input circuitry is shown FIG. 2. The analog signals at AUXI and TXI are summed together and sent on to line driver 62 unless disabled by bits CTR.2 and CTR.3 in Control Register 72. These bits can be used as a mux for switching between voice and data when using the software mode (SPS=1). In the hardware mode, AUXI and TXI are always enabled and switching must be done externally.

The peak detector circuit 84 continuously samples the output of the input summing op-amp 82 to determine if the level is too high. Signals routed on to line driver 62 must be less than −4 dBm (0.5 Vrms) to meet FCC Part 68 limits for maximum transmission level (line driver 62 itself has unity gain). If the level to line driver 62 is higher than −4 dBm, peak detector 84 begins to attenuate the signal until it is in compliance (adjustment is only in the direction of increasing loss). The attenuation range is 10 dB; if more than 10 dB of loss is needed, the peak detector will disable the signal path to the line driver. Once the attenuation has reached a stable setting, it can only be reset by either taking GSRST high or by cycling the power. Taking GSRST high resets the attenuation setting back to 0 dB (no loss), effectively disabling the signal limiting function for as long as GSRST is high. The peak detector 84 returns to normal operation once GSRST goes low again.

The GSRST input may also be taken high to transmit DTMF tones at the higher level of +2 dBm, resulting in −4 dBm on the telephone line. Part 68 permits a level of 0 dBm maximum for DTMF tone transmission. Once the DTMF digits have been sent, GSRST should be returned low to limit normal data transmission levels to −4 dBm maximum at the TXO output. Improvements in transmission quality throughout the telephone network has greatly reduced the need to transmit at such higher levels; therefore using GSRST in this manner is usually not necessary.

The attenuation steps are as follows: 0, −0.25, −0.5, −1.0, −2.0, −3.0, −6.0, −10.0, and infinite (signal path disabled). The initial steps are gradual to permit transmission near the maximum of −4 dBm at TXO. The limit of −4 dBm was chosen since the matching resistor to the telephone line will normally introduce another 6 dB of loss. Therefore, the resulting power on the telephone line will be −10 dBm which is 1 dB less than the maximum level allowed by Part 68 of −9 dBm for data signals. The 1 dB margin is necessary for variations in the absolute accuracy of the peak detector due to changes in process, temperature, and supply voltage. The peak detector 84 steps through the attenuation values until a level less than −4 dBm is reached.

It is important to note that the peak detector 84 monitors and attenuates the sum of TXI and AUXI. If TXI and AUXI are both enabled and their respective signal levels are at −6 dBm, the sum may exceed −4 dBm which will cause the peak detector 84 to introduce the appropriate amount of attenuation.

An on-chip billing delay circuit is provided to meet Part 68 requirements to provide the network adequate time for billing information before modem data is sent.

The billing delay is nominally set to 2.25 seconds, well within the 2 seconds required. The billing delay timer 86 is triggered by a negative transition on OHIN\ which causes the TXO output to be squelched for at least 2 seconds. Afterwards, the TXO output begins to respond to signals at the TXI and AUXI inputs as described previously.

The billing delay only operates when going off-hook in answer to a ring signal. Specifically, if a ring burst has not been received in the 8 seconds preceding OHIN\ going low, the billing delay is unused and TXO is enabled immediately. This permits the host system to go off-hook when needing to immediately dial a number. It is then the responsibility of the answering modem to provide a 2-second delay before sending data.

The transmit line driver 62 takes the output of the input summing op-amp 82 and buffers it to TXO pin. Normally, TXO would be connected through a line matching resistor to a telephone coupling transformer. The resulting impedance attached to TXO is the matching resistor plus the telephone line impedance—typically 1.2K ohms (600+600=1.2K ohms). The line driver 62 will actually drive up to 600 ohms without significant distortion up to the point of clipping. Clipping typically occurs when the signal at TXO is within 0.25 volt of either power supply rail.

The line driver 62 also removes extraneous high-frequency signals using a 1-pole low-pass filter with a break point at 12 KHz. This filter attenuates the clock switching noise that modem devices typically add to the modulated data signal as well as any coupled noise from the power supply. A typical clock switching frequency of 128 KHz would be attenuated by 20 dB before transmission out to TXO. A spectrum analyzer should be used to look at the TXO output to check that attenuation of out-of-band signals conforms to Part 68 requirements. Typically, the internal low-pass filter provides adequate attenuation.

The TXO output has a DC offset of VCC/2 volts (2.5 volts if Vcc=5 volts) and usually should be AC-coupled with a capacitor when connecting to a transformer. Typically one leg of the transformer is hooked to ground which means that TXO would have to drive 2.5 volts into the large DC load of the line matching resistor if not AC-coupled. A value of 1 uF or more is usually adequate; lower values may introduce in-band attenuation of the transmit and receive signals. If a low impedance mid-supply is available in the system, then it may be tied to the transformer in lieu of ground. In that case, the coupling capacitor is not needed.

When the power-down mode is entered (PD=1 in the Control Register 72), the TXO output is tri-stated to help conserve power. Note that the off-hook relay 56 should disconnect the phone line connection when using the power-down mode since the TXO output is now in a high-impedance state (i.e., the reflected impedance back to the line is no longer 600 ohms).

Figure 3:
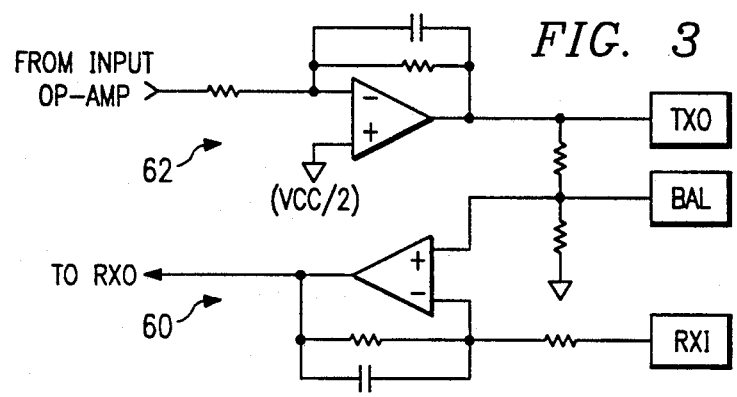

The internal electronic 2- to 4-wire hybrid circuit 60 splits the signal to/from the telephone line into separate transmit and receive signals. As illustrated in FIG. 3, hybrid 60 consists of an op-amp which sums a portion of the TXO signal with the signal at RXI which is usually tied to the external coupling transformer. The receive gain from RXI to the output of hybrid 60 is about 1.5 dB to make up for the typical insertion loss of a coupling transformer. Hybrid 60 assumes that the TXO component at RXI will be 6 dB lower than that at the TXO pin. As a result, the sum of the TXO signal through the inverting and non-inverting gain paths of the hybrid op-amp is theoretically 0, which means that only the receive signal from the other end of phone line should be present at the hybrid output (RXO). However, due to variations in the phone line impedances, the signal at RXI varies in phase and amplitude from the ideal case; consequently the TXO component is not completely cancelled by hybrid 60. Typically, the return loss (the loss of the transmit signal through hybrid 60) varies from 10 to 16 dB.

The return loss of hybrid 60 can be adjusted by an external compensation network attached to the BAL pin. External balancing is optional and in most cases the user can simply float this pin. The amplitude and phase of the signal routed to the non-inverting terminal of the hybrid op-amp can be programmed using external resistors and capacitors. When using external resistors make sure to use values low enough to swamp out the internal resistor divider.

Another way to balance hybrid 60 is to change the external line matching resistor (nominally 600 ohms) until the TXO component at RXI is exactly 6 dB lower than at TXO. Phase compensation may be added by tying a capacitor from either TXO or GND to the BAL pin. Note that the absolute values of the internal resistors connected to the BAL vary 20% while their ratio varies only 0.1%.

The output of hybrid 60 is sent on to the RXO pin and to programmable gain op-amp 82 which feeds the RXMON pin. RXO and RXMON are both designed to drive 5K or more ohm loads.

The RXMON output is a gain-programmable version of the signal at RXO (RXMON is also 180 degrees out of phase with RXO). In the software mode, the gain from hybrid 60 output to RXMON can be programmed using Receive Monitor Gain register 74. Eleven gain values ranging from +9.0 to −21 dB in 3 dB increments can be selected. An additional value (OFF) can be used to completely mute the RXMON output. This might be useful when using circuit 50 with a handset for voice/data switching. RXMON can also be connected to a speaker buffer amp for use with a monitor speaker. A monitor speaker is normally included in Hayes TM compatible modems; the AT command set in such modems specifies programmable speaker levels which can be easily implemented using RXMON.

In the hardware mode (SPS=0), the gain for RXMON is programmed by using the CS and CLK multifunction pins. The 4 gain values supported are shown below:

TABLE 1

| HARDWARE MODE GAIN | | |
|---|---|---|
| CS | CLK | Gain (dB) |
| 0 | 0 | +6.0 |
| 0 | 1 | 0.0 |
| 1 | 0 | −6.0 |
| 1 | 1 | off |

Figure 4:
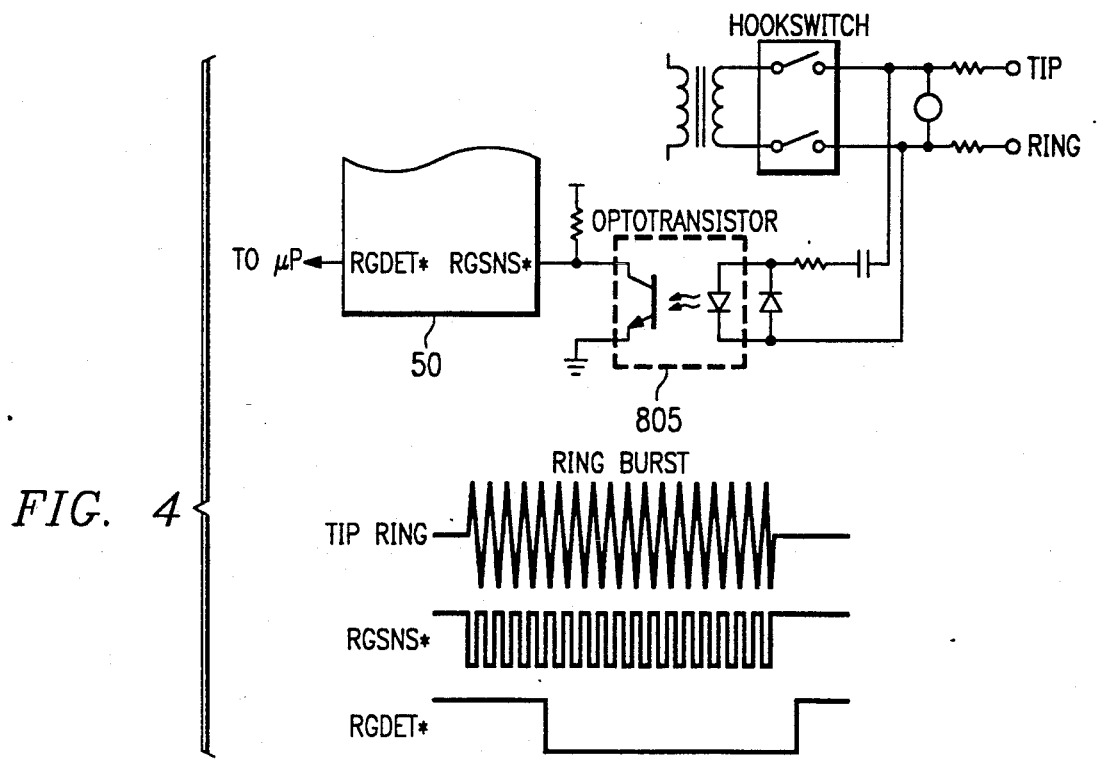

Ring detection can be accomplished using the RGSNS\ and RGDET\ pins with an external optocoupler sensor circuit (see FIG. 4). The RGSNS\ input digitally integrates low-going pulses output from a ring sensing optocoupler. The integrated signal is then fed to the RGDET\ output which goes to a logic 0 when a valid ring signal has been received at RGSNS\. RGDET\ is an open-drain output and should be pulled up by an external resistor to define the off-state (logic 1). The RGDET\ state is also reported by Status Register 66 in the software mode; each ring occurrence is latched by the RGDET bit; a read operation of this register clears the RGDET bit until the next valid detection of a ring burst.

Ringing on the telephone line can be 15 to 68 Hz in frequency and 40 to 150 Vrms in amplitude. The task of the ring sensor circuit is to provide the RGSNS\ pin with low pulses corresponding to the ring signal exceeding some voltage threshold. FIG. 4 shows a recommended circuit which provides the ring sensing as well as the 1000 Vrms isolation required by Part 68. The final processed ring detect signal is presented at RGDET\ which can then be used by microprocessor 80. This circuit in FIG. 4 also presents an on-hook AC impedance that complies with FCC Rules Part 68.

Low-going signals at RGSNS\ also cause circuit 50 to exit the power-down mode. The purpose of this feature is to allow a ring signal to wake up a system that is in a low-power state. Once powered-up, circuit 50 internally clears the PD bit in the Control Register 72.

Figure 5:
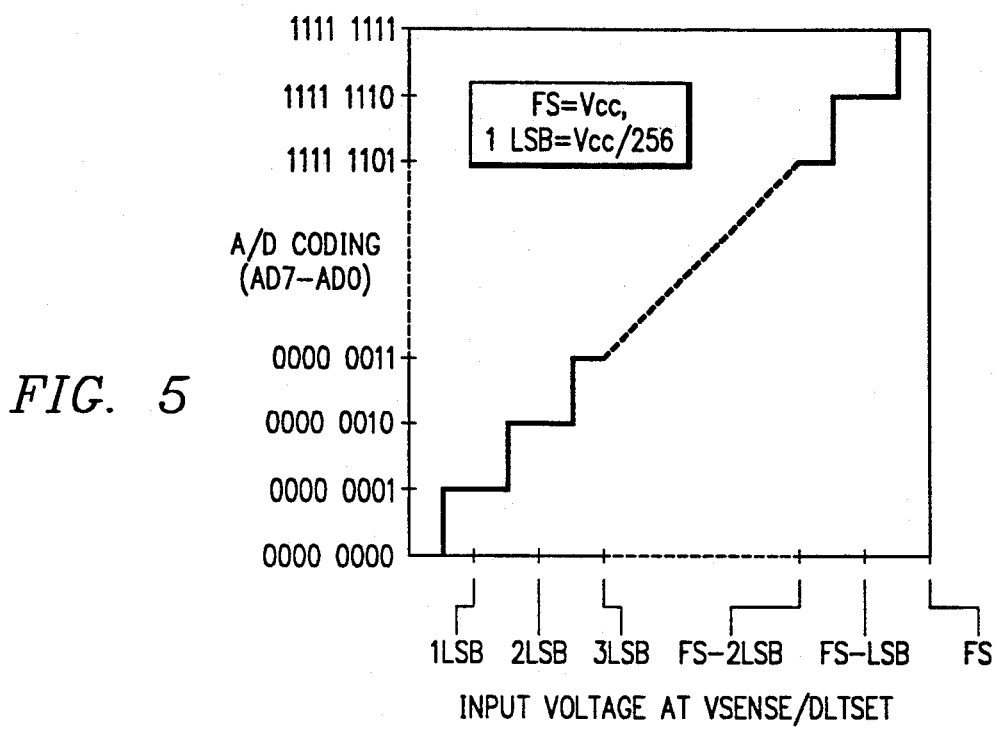
FIG. 5 shows the transfer function of the analog-to-digital converter of the first preferred embodiment.

Circuit 50 includes an 8-bit linear A/D converter 68 for use with low-frequency and DC signals. The converter 68 can sample either the VSENSE or DLTSET inputs, depending upon the mode circuit 50 is in. The result of the A/D conversion is placed in the A/D Data Register 76 (ADR) which can be read through the serial port. The coding for the 8-bit data sample is shown in FIG. 5.

Input signals at VSENSE or DLTSET may be anywhere in the range from GND to Vcc; each step of A/D converter 68 is then Vcc/256 volts. For a typical Vcc = +5 V, A/D converter 68 can resolve down to 20 mV. The absolute accuracy of converter 68 is entirely dependent upon Vcc; no internal reference is used. Signals connected to VSENSE should use the Vcc supply so that the changes in Vcc will not affect the A/D conversion accuracy. The input impedance is typically 8 pF to ground (GND).

Figure 11A:
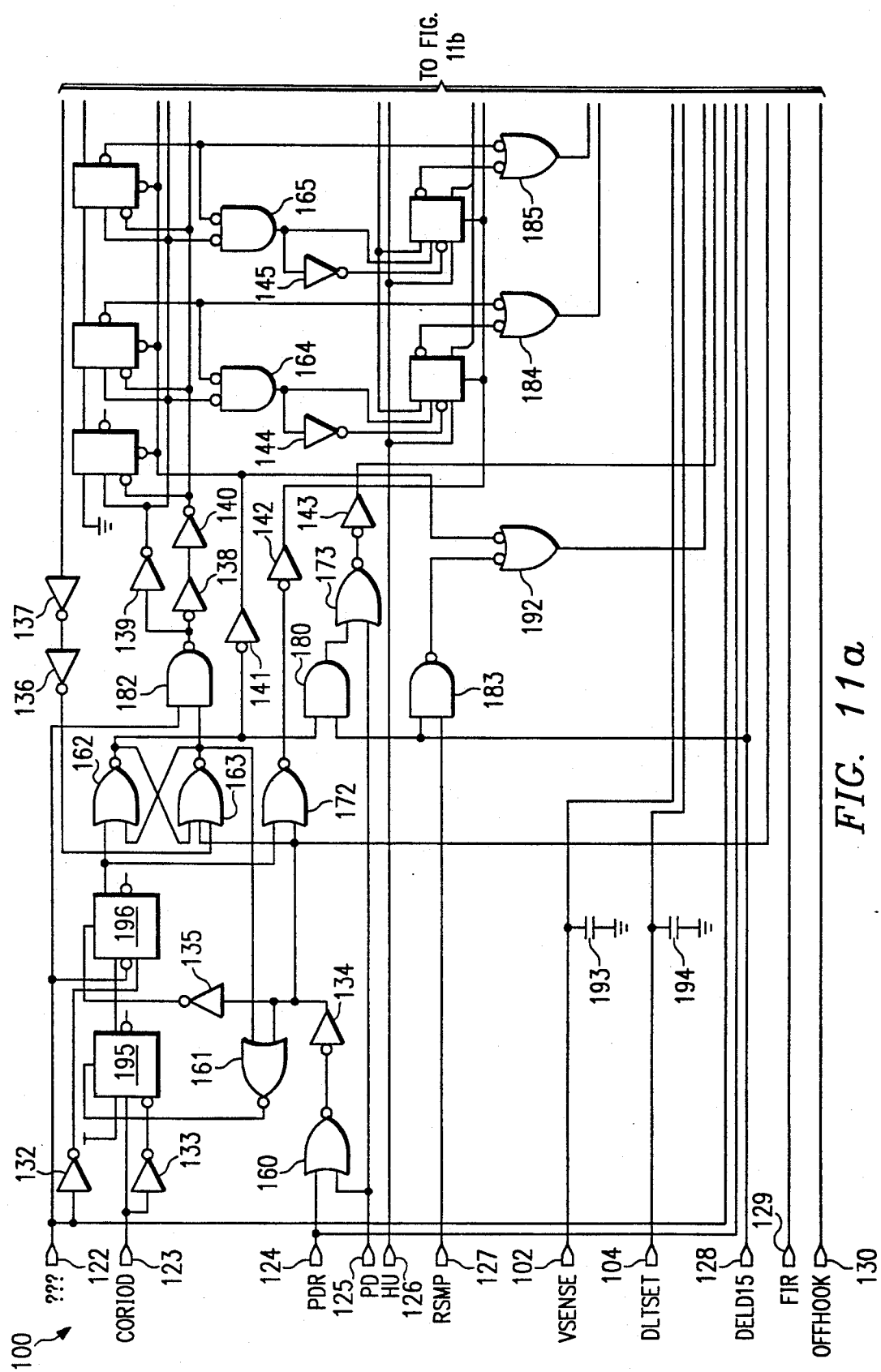
FIGS. 11(a)-(b) are a block diagram of the preferred embodiment loop current detector of the first preferred embodiment circuit.
Figure 11B:
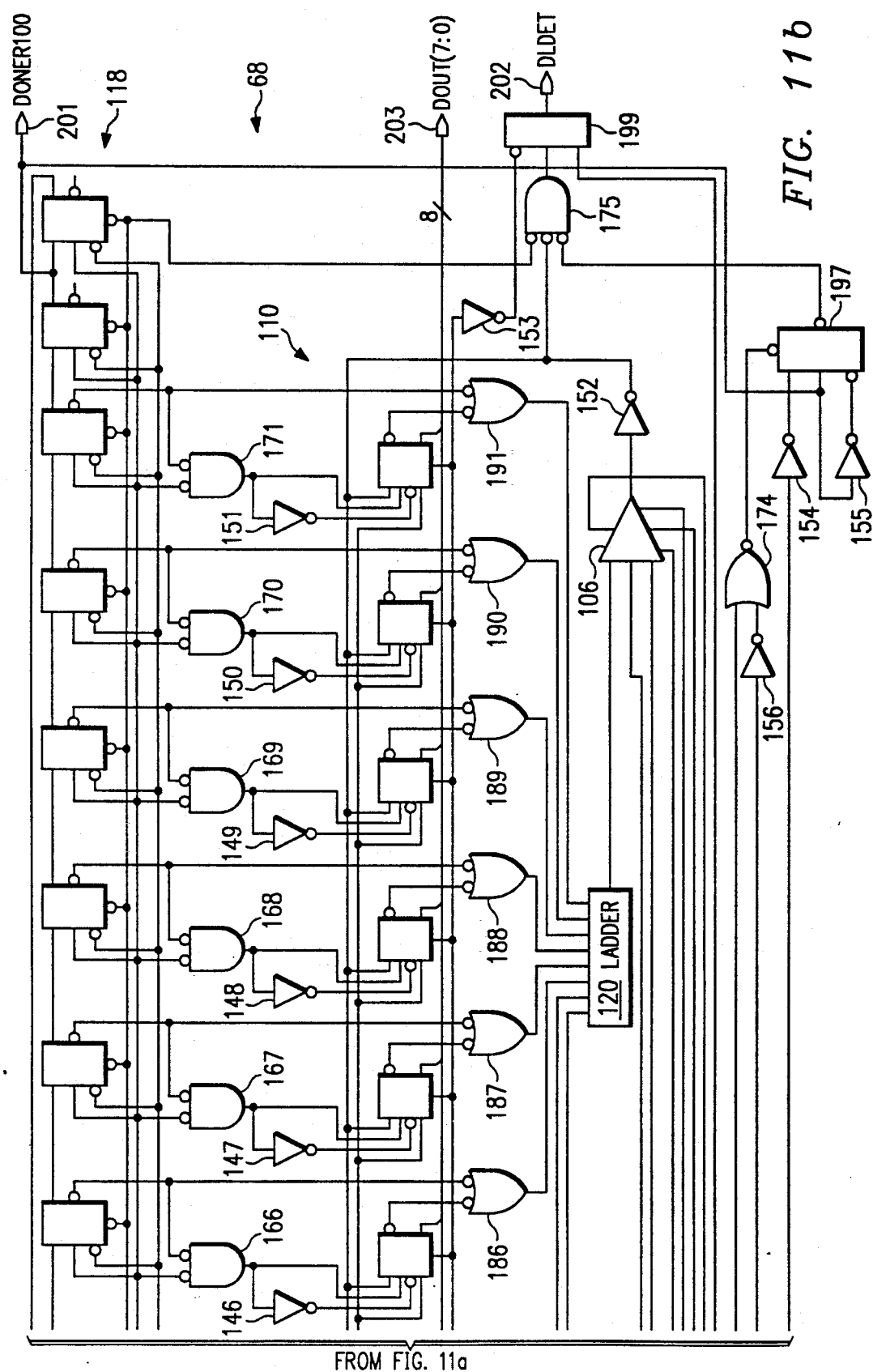

The converter architecture uses a successive-approximation register (SAR) approach with an R-2R ladder DAC (see FIG. 11). This approach lends itself to quick conversion times (80 usec typically) with excellent accuracy and linearity. Converter 68 does not include a sample-and-hold stage since the intended use is with slowly varying or DC signals (this does not preclude the use of an external sample and hold circuit). The clocking for the conversion process is derived from an internal 130 KHz oscillator that is also used for the billing delay timing.

The delta detector 70 is for use in a phantom modem by sensing changes in the DC loop current of the telephone line. Loop current sensing is important for detecting when extension devices on the telephone line go off-hook. For example, circuit 50 could be used in a FAX or modem application in order to know when a telephone handset was picked up. A teleservicing application can use the phantom feature to non-intrusively borrow the telephone line when it is free and to release it when someone picks up an extension phone set.

In the hardware mode (SPS=0), delta detect circuit 70 reports changes in the voltage at VSENSE using A/D converter 68. In this mode, the signal at DLTSET is automatically sampled 250 msec after each falling edge at OHIN\ ; this sample is stored in the R-2R DAC 120 (see FIG. 11) and then continuously compared to the voltage at VSENSE. When the voltage at VSENSE is lower than the old sample of DLTSET, the DLTDET pin transitions to a logic 1. DLTDET stays high until the VSENSE input goes back to a higher voltage or when OHIN\ goes high. To resample DLTSET after the automatic sample is taken, the D/Q pin can be used. A rising edge at D/Q in the hardware mode causes a new sample to be taken of DLTSET.

Figure 6A:
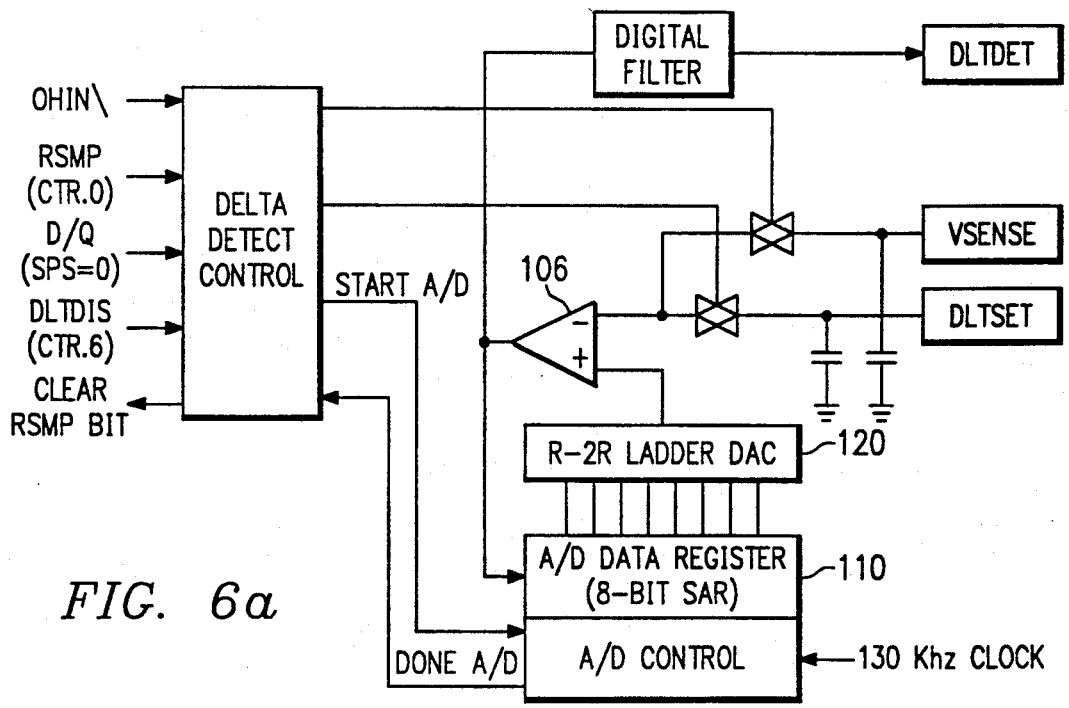
FIG. 6a is a schematic diagram of the preferred embodiment loop current detector of the first preferred embodiment circuit.
Figure 6B:
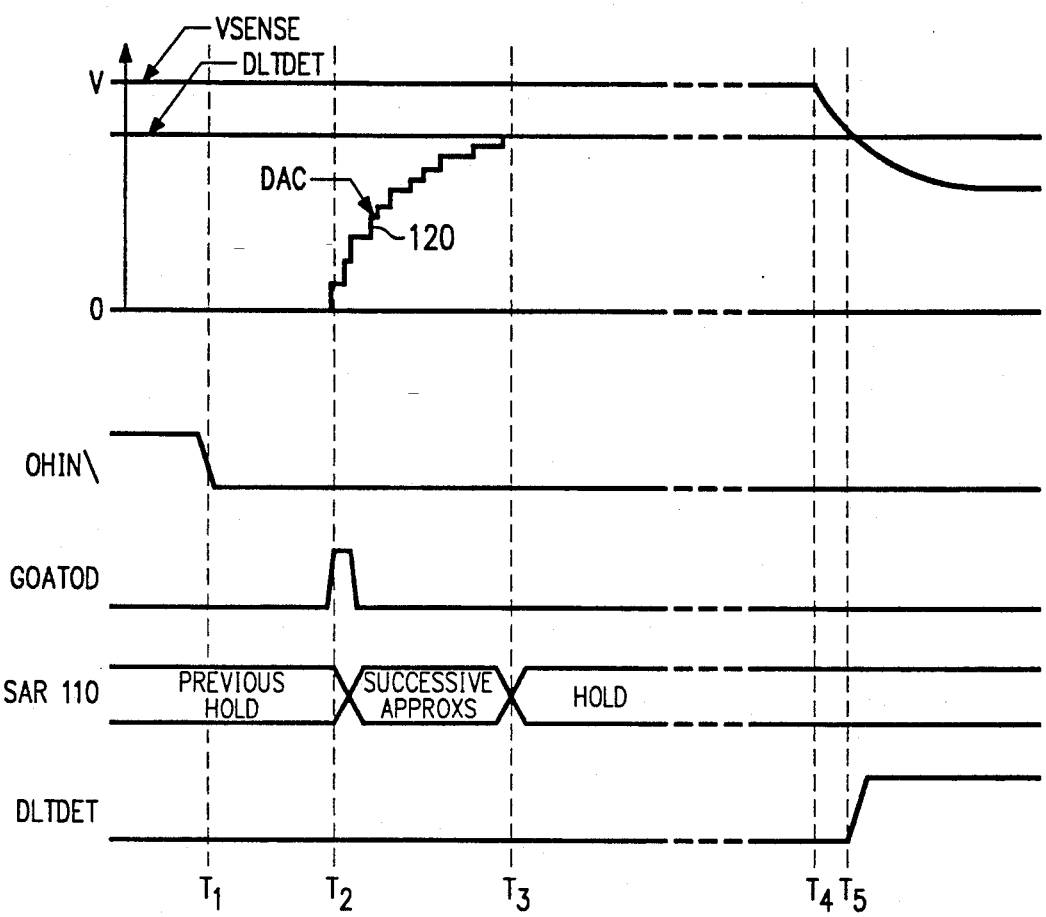

A resistor divider can be placed between the VSENSE and DLTSET inputs to program where the DLTDET triggers; for example, FIG. 1b shows such a divider 94. To detect a 50% change at VSENSE, both resistors of the divider should be equal; FIG. 1b shows resistors for detection of a 20% change. FIG. 6a is a schematic diagram of delta detector 70, and FIG. 6b is a timing diagram illustrating the operation. In particular, if at time t1 circuit 50 receives an off-hook signal (OHIN\ low), then after a delay of about 0.5 sec a GOATOD pulse is generated at time t2 and this begins the analog-to-digital conversion and storage of the DLTSET voltage in SAR 110. The successive approximations to DLTSET are indicated by the output of the Digital-to-analog converter 120, and the conversion is complete at time t3. Thus at time t3 SAR 110 contains the digitized value of DLTSET (which presumably has not changed significantly during t2 to t3 which is about 80 usec), and this value of DLTSET is then continually output by DAC 120 to comparator 106 for continuous (sampled at 130 KHz) comparison to VSENSE. If another telephone set on the same telephone line goes off-hook at time t4, then the loop current will drop due to the increased resistance, and VSENSE will drop as shown, and will be less than DLTSET by time t5. Typically, VSENSE will drop to about 50% of its value prior to time t4, and thus setting DLTSET at about 75% to 80% of VSENSE at time t2 is convenient for noise immunity and voltage drift tolerance. If three successive samples of VSENSE are smaller than the analogized version of DLTSET held in SAR Register 110, then DLDET is set high to indicate the apparent use of the telephone line by another telephone set.

In the software mode, the delta detector can be controlled using the DLTDIS bit in Control Register 72. When DLTDIS=1, the delta detector circuit is disabled (DLTDET is forced to a 0). An 8-bit A/D conversion of the signal on the VSENSE pin is initiated by setting the RSMP bit to a 1; when the conversion is complete, this bit is automatically cleared internally (the host can poll this bit to see when the conversion is done). Each conversion result is written into the ADR register 76 which can then be retrieved by the host.

If the DLTDIS=0, the delta detector is enabled and a sample of the DLTSET input is automatically taken after each high-to-low transition at OHIN\ (just as in the hardware mode). Setting the RSMP bit high in this mode initiates resampling of the DLTSET signal (not VSENSE) which is then continuously compared to the VSENSE signal. The DLTSET samples are stored in the ADR register 76. The DLTDET output can be used as an interrupt to alert the host microprocessor of voltage changes as an alternative to polling of the serial port.

Figure 7:
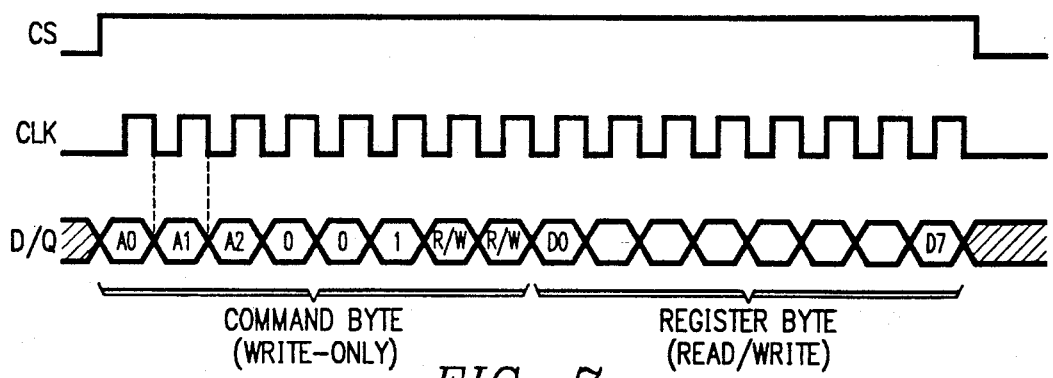
FIGS. 7-9 are timing diagrams for various portions of the first preferred embodiment circuit.
Figure 8:
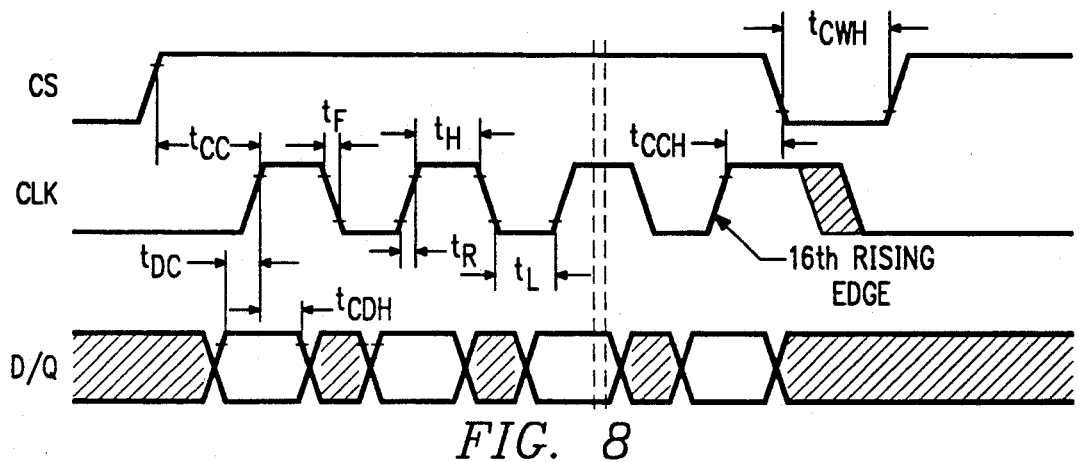
Figure 9:
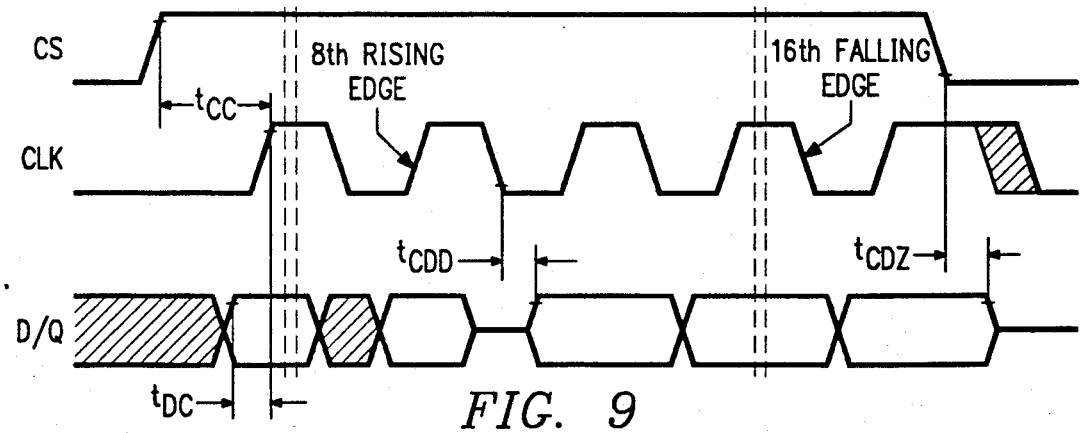

The serial control port of circuit 50 consists of three pins: CS, CLK and D/Q. These three signals provide synchronous access of internal control and status registers 66, 72, and 74. To use the serial port, circuit 50 must be placed in the software mode by tying the SPS (Serial Port Select) pin high. The host can then access the internal registers by transferring a two-byte sequence; the first byte is write-only and provides command and register address information, while the second byte is the actual register data that is either rad or written by the host. Data bytes to or from circuit 50 are always transferred LSB first. The serial port can be operated at any time, even when circuit 50 is in the power-down mode. As shown in FIG. 7, a serial port operation is initiated by first taking CS (Chip Select) high. The host then clocks in the command byte using a clock supplied to the CLK pin. Data written to the D/Q pin is sampled on rising edges of CLK. The first three bits indicate register address information, the next three bits device selection bits, and the last two bits the type of operation (rad or write). Currently, only four registers are avaiable for host use. The next eight clock cycles at CLK transfer data into or out of a particular register within circuit 50. For a write operation, circuit 50 samples data at D/Q on rising clock edges; for a read operation, data at D/Q is updated on falling clock edges. Note that for a read operation circuit 50 will drive the D/Q line after the eighth falling edge of CLK. Once the last bit has been transferred, the CS line should be taken low to terminate the operation. FIGS. 8 and 9 are timing diagrams for the write and read operations, respectively.

Figure 10:
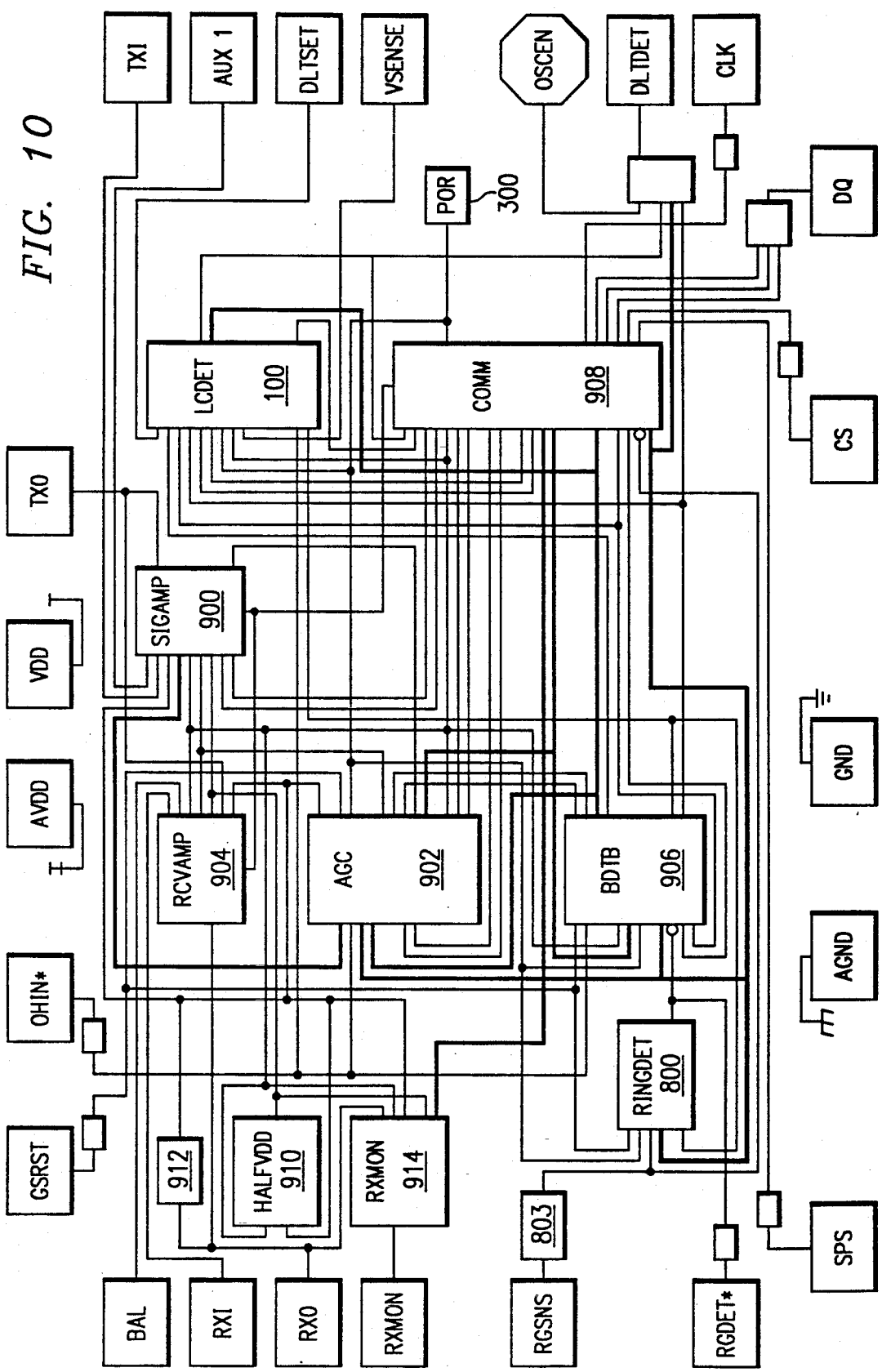
FIG. 10 is a block diagram of the first preferred embodiment circuit.

FIG. 10 is a more detailed schematic diagram of the first preferred embodiment shown in FIG. 1a, and shows the chip pads labelled with the same signal acronyms, various buffers as small unreferenced blocks (including buffer 803), and the following function blocks: SIGAMP 900 which is the transmit path amplifier and contains an adjustable gain stage controlled by the automatic gain control (AGC), AGC 902 which is an automatic gain control circuit and it limits transmit amplifier output, RCVAMP 904 which is the receive path amplifier, BDTB 906 which is the billing delay timer and it generates a two second disable of the transmit and receive amplifiers, COMM 908 which has the serial port interface and control and status registers, HVDD 910 which is an internal analog reference at Vdd/2, IREF 912 which is a bias current generator for operational amplifiers, RXMON 914 which is the gain programmable amplifier for audio monitor, RINGDET 800 which filters and detects ring signals, LCDET 100 which is the loop current detector, and POR 300 which generates a power on reset signal.

Figure 13:
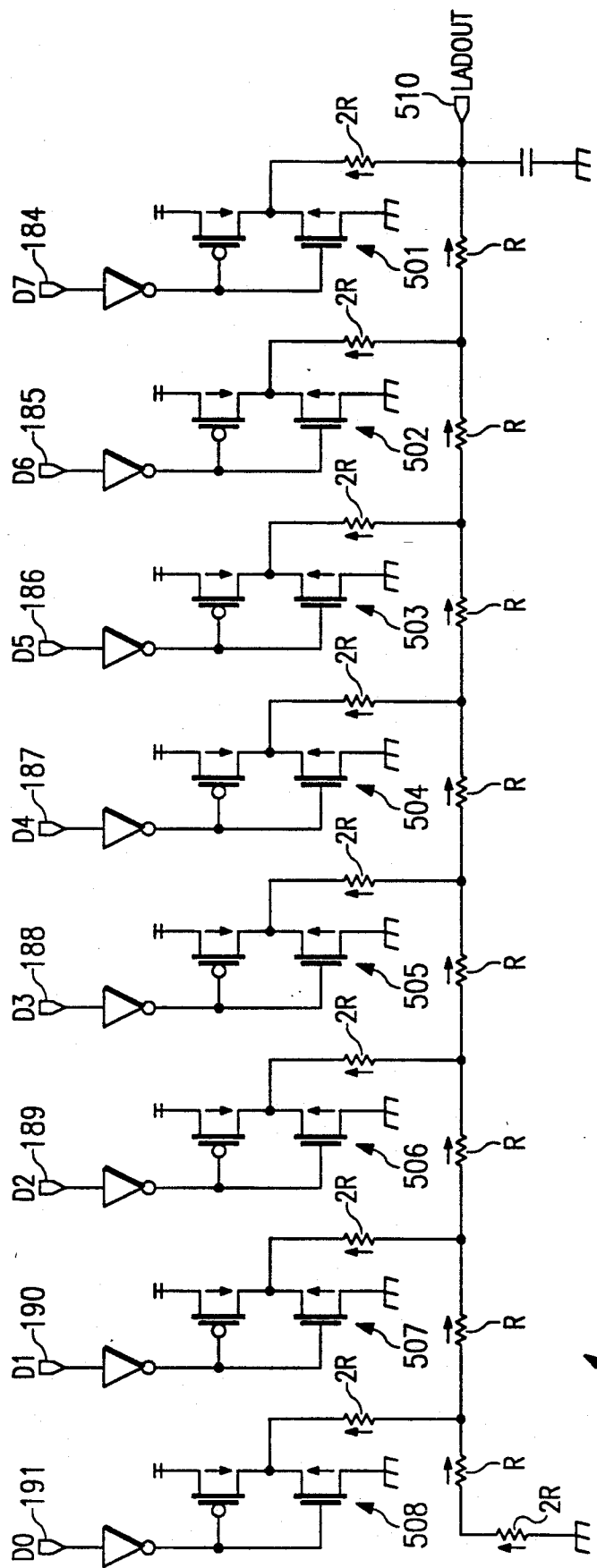
Figure 14:
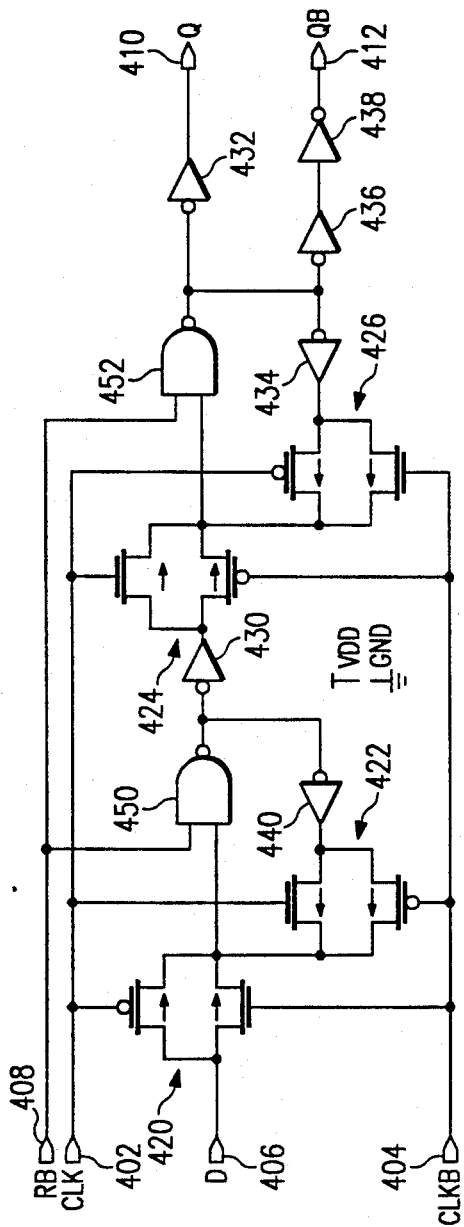
Figure 15A:
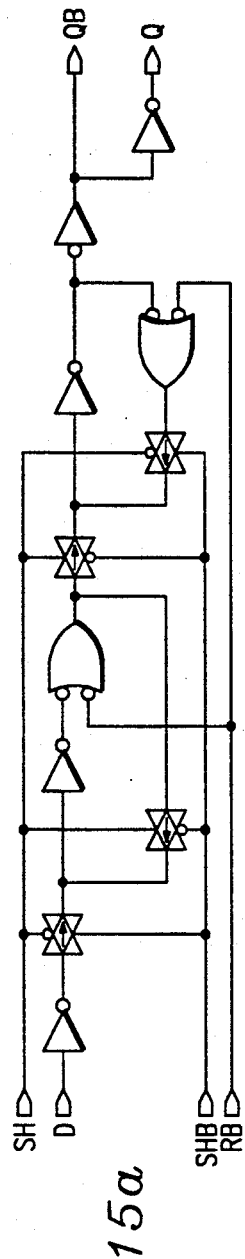
Figure 15B:
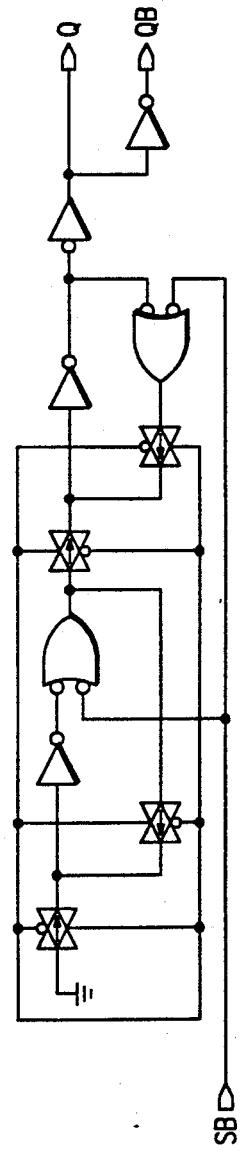
Figure 16:
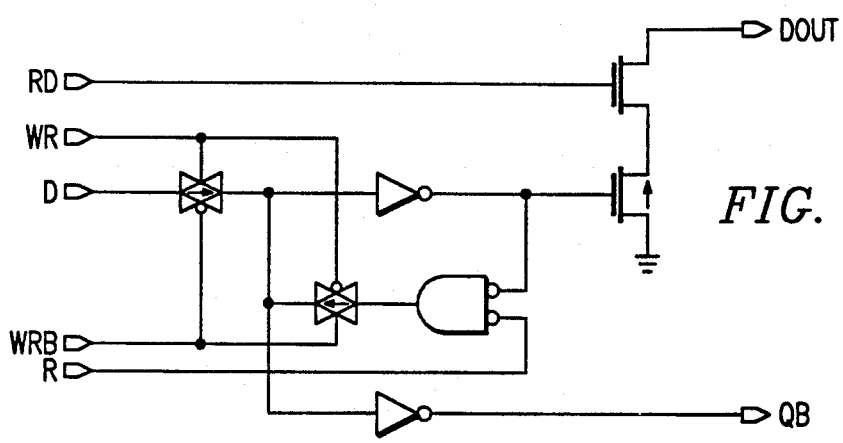

FIG. 11 is a more detailed schematic diagram of the loop current detector 100 which also is shown in FIG. 6a. In particular, FIG. 11 shows detector 100 which includes VSENSE input terminal 102, DLTSET input terminal 104, dynamic comparator 106 (schematic in FIG. 12), 8-bit successive-approximations holding register 110, 11-bit shift register 118, digital-to-analog converter 120 which has a R-2R resistor ladder (schematic in FIG. 13), sampling input terminal 122, A/D conversion input terminal 123, power-on-reset input terminal 124, power down input terminal 125, read data input terminal 126, resample input terminal 127, delta disable input terminal 128, FIK input terminal 129, off hook input terminal 130, inverters 132-156, NOR gates 160-175, AND gate 180, NAND gates 182-192, capacitors 193-194, flip-flops 195-197, circuit 199, done output terminal 201, delta detect output terminal 202, and 8-bit data output port 203. FIG. 14 is a schematic diagram for the flip-flops, FIGS. 15a-b are schematic diagrams for the cells making up shift register 118 (the lefthand starting cell is shown in FIG. 15b and the remainder are shown in FIG. 15a), and FIG. 16 is a schematic diagram for the latch cells making up successive-approximations holding register 110.

The operation of loop current detector 100 is as follows. First consider the input at power down input terminal 125 to be high, then the output of NOR gate 160 will be low regardless of the input at terminal 124, the output of inverter 135 will be low and flip-flop 196 will be held in reset (see FIG. 14 and note that input RB is low), and the latch formed by NOR gates 162 and 163 will be held with the output of NOR gate 162 high and the output of NOR gate 163 low. These outputs of the 162-163 latch imply (1) the output of inverter 141 is low and this resets all of the cells of shift register 118 to output $Q=0$ and except the first (lefthand) cell which is set to $Q=1$, (2) the output of inverter 139 is low and the output of inverter 140 is high, so each cell of shift register 18 is open to accept data (that is, the SH signal is low and SHB signal is high in FIGS. 15a-b). The leftmost cell in FIG. 11 has its data input grounded, and each of the other cells has its data input connected to the output of the lefthand neighboring cell, which as just noted has an output of $Q=0$ (low) except the first cell. Thus shift register 118 is cleared to all $Q=0$ except the first cell which has $Q=1$.

Inverter 134 high also implies the output of NOR gate 161 is low and flip-flop 195 is reset to $Q=0$, and this output is connected to the data input of flip-flop 196. Inverter 134 high further implies the output of NOR gate 172 is low and thus the output of inverter 142 is high. This will reset each of the cells of holding register 110 because the write signal (WR in FIG. 16) is low due to the zeros (lows) in the cells of shift register 118 which are connected to holding register 110 since these zeros mean that the QB outputs are all high and fed into NOR gates 164-171 which output the write signals. Thus holding register 110 is cleared to all zeros.

Figure 17:
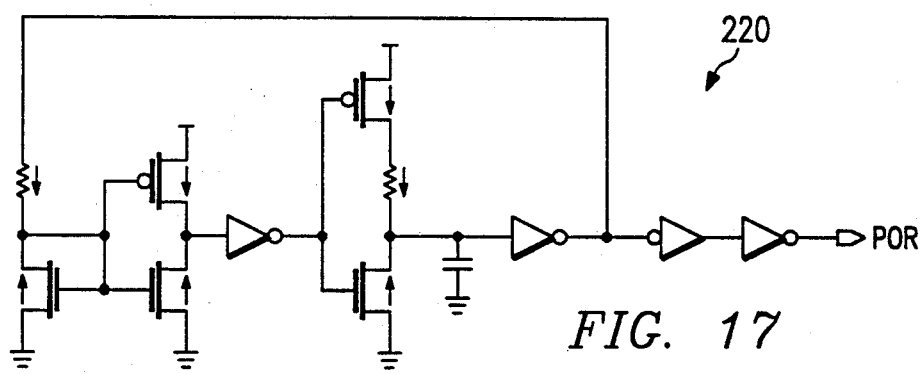

At this point note that the power-on-reset circuit 220 (FIG. 17) provides a high pulse of duration 600 nsec when the first preferred embodiment circuit is powered up, and this pulse fed into NOR gate 160 clears shift register 118 (except the first cell) and holding register 110 to zeros in the same manner as the high input on terminal 125 does as described in the preceding paragraphs.

Figure 12:
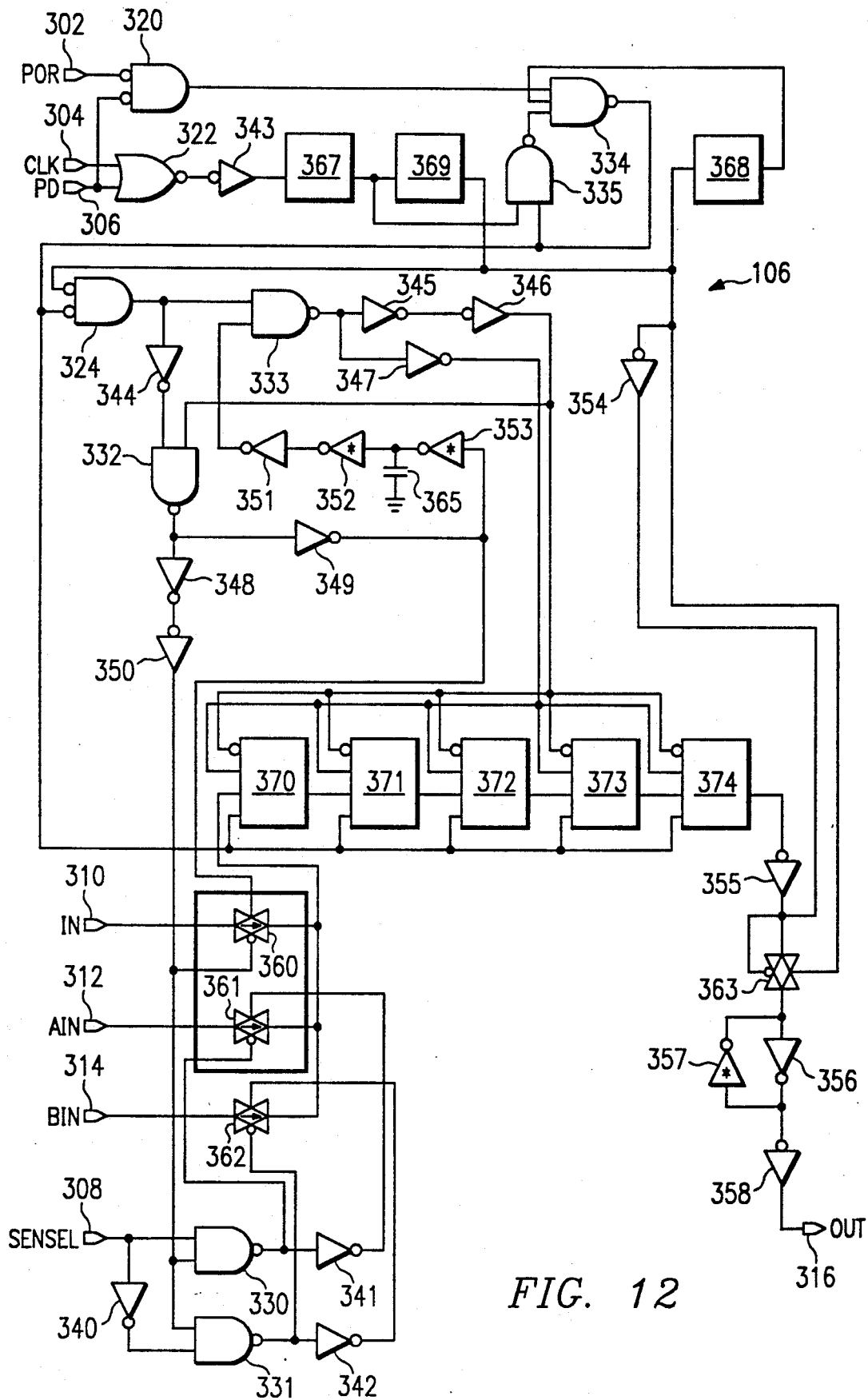
FIGS. 12, 13, 14, 15a, 15b, 16, 17, 19, and 21 are schematic diagrams of portions of the preferred embodiment loop current detector.
Figure 21:
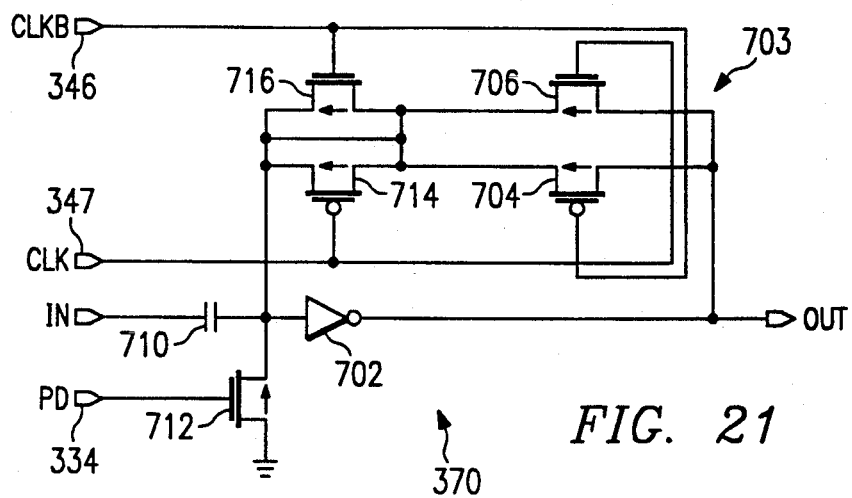

A high input on power down terminal 125 also implies a high output for inverter 143 which inputs to terminal 306 of dynamic comparator 106; see FIG. 12. Comparator 106 includes digital input terminals 302, 304, 306, and 308, analog input terminals 310, 312, and 314, digital output terminal 316, NOR gates 320, 322, and 324, NAND gates 330-335, inverters 340-358, transmission gates 360-363, capacitor 365, low one-shots 367-368, high one-shot 369, and comparators 370-374. The high on terminal 306 resets comparator 106 as follows: the high drives NOR gate 322 low (which stops the 130 KHz clock signal on terminal 304) and holds the input to low one-shot 367 high, so the output of one-shot 367 is high. Also, the high on terminal 306 drives NOR gate 320 low, and thus the latch formed by NAND gate 334 and 335 has a high output at 334 and a low output at 335. The high output at 334 makes NOR gate 324 low and the latch formed by NAND gates 333 and 332 plus inverters 345, 346, 349, 351, 352, and 353 and capacitor 365 is set with the output of NAND gate 332 low and the output of NAND gate 333 high and capacitor 365 discharged. The high at NAND gate 334 also resets comparators 370-374; see FIG. 21 which is a schematic diagram of each of comparators 370-374. Note that a high power-on-reset signal also resets comparators 370–374 in the same manner by driving the latch 334–335 into the same state.

Return to FIG. 11 but now consider the situation of the signals at input terminals 124 (POR) and 125 (PD) are both low; that is, presume that the Power-On-Reset has been done so that flips-flops 195–196 are set to Q=0, shift register 118 (except the first cell) and holding register 110 are zeroed, dynamic comparator 106 is comparing to zero, and the circuit is not being Powered Down. Then comparator 100 operates as follows. First consider the case with the input at terminal 123 low (a high pulse on this terminal starts the analog-to-digital conversion of a sample and loads it into holding register 110 as will be described below). This low is the clock input to flip-flop 195, so the flip-flop stays in the Q=0 state and outputs a low to the data input to flip-flop 196. 130 KHz signal at input terminal 122 drives the clock input to flip-flop 196, but since only low data is available, the output of flip-flop 196 remains low. Also, because the righthand end cell of shift register 118 was zeroed during the previous reset, it outputs a low to inverter 137 which then provides a low from inverter 136 to the latch formed by NOR gates 162 and 163. Consequently, the latch remains in the state with the output of NOR gate 162 high and the output of NOR gate 163 low. This low from NOR gate 163 drives NAND gate 182 high and effectively blocks the 130 KHz signal at terminal 122 from passing through and clocking shift register 118.

Figure 20:
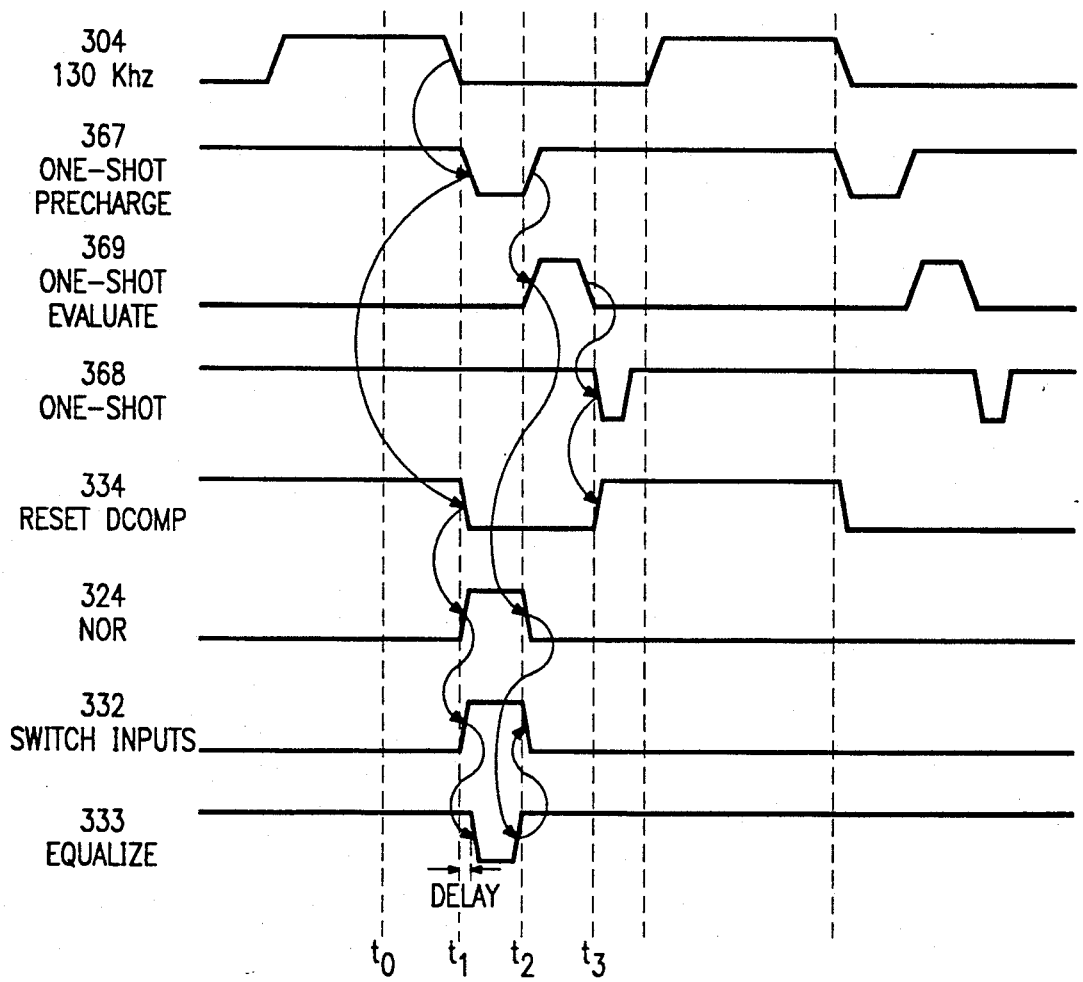

Conversely, the dynamic comparator 106 (FIG. 12) has the 130 KHz signal passing through NOR gate 322 and inverter 343 to fire one-shot 367 every cycle, and this in turn fires one-shot 369 which fires one-shot 368 and also switches the latch formed by NAND gates 332–333 plus inverters 345–353 and delay capacitor 365 as shown in timing diagram FIG. 20. Note that the high-to-low transition of NAND gate 333 is delayed by about 10 nsec due to the charging of capacitor 365, and this provides the necessary asymmetry for comparators 370–374 operation. Explicitly, the comparison of VSENSE or DELSET with the analog version of the contents of holding register 110 proceeds as follows. First at time t0 in FIG. 20 the analog version of the contents of holding register 110 are being applied to the input capacitor 710 of comparator 70, transmission gate 703 (made of p-channel FET 704 and n-channel FET 706) is being held nonconducting in each of comparators 370–374, and inverter 702 in each of comparators 370–374 has a low input being applied by a high from NAND gate 334 turning on each n-channel FET 712. Next, at time t1 one-shot 367 fires and drives NAND gate 334 low to disconnect the inputs of inverters 702 from ground and let them float. NAND gate 334 going low also drives NOR gate 324 high which in turn drives NAND gate 332 high and turns either transmission gate 361 or 362 conducting and turns transmission gate 360 nonconducting. The selection between gates 361 and 362 is determined by the signal at input terminal 308: if the signal is high, then the transmission gate 361 is conducting and transmission gate 362 is nonconducting, and conversely for the signal at input terminal 308 low. This applies either the VSENSE or DLTSET analog signal to capacitor 710 of comparator 370. Then after the approximate 10 nsec capacitor 365 charging delay (see "delay" in FIG. 20), NAND gate 333 goes low and turns transmission gate 703 conducting to connect the output of inverter 702 to its input in each of comparators 370–374. This equalizes at about 2.1 volts for a Vdd of 5 volts and a p-channel to n-channel gate width ratio of 17 to 10 for inverter 702. Note that this jump from 0 volts to 2.1 volts at the input of inverter 702 in comparator 370 could have a residual effect on the subsequent voltage comparison if a high impedance output such as holding register 110 were still connected to the other plate of capacitor 710. This equalization sets each inverter 702 to the approximate center of its linear region where it will act as a high negative gain amplifier for small signals, and these amplifiers are cascaded, so variations as small as 20 mV at the input to comparator 370 will yield a definite high or low output at comparator 374. Next, at time t2 one-shot 367 returns to a high output and this triggers one-shot 369 which in turn drives NOR gate 324 low. NOR gate 324 going low drives NAND gate 333 high and after one inverter delay (inverter 347) of about 2 ensec this drives transmission gate 703 nonconducting (capacitors 714 and 716 compensate for the charge injected during this turn off of FETs 704 and 706) to leave each of inverters 702 floating and balanced at the approximate center of its linear region. NAND gate 333 going high drives NAND gate 332 low after two inverter delays (inverters 345 and 346) and this switches (after another inverter delay from inverter 349) from transmission gate 361 or 362 conducting to transmission gate 360 conducting. Thus the input voltage at capacitor 710 of comparator 370 jumps (either positive or negative) from VSENSE or DLESET to the analog version of the contents of holding register 110 about two inverter delays (4 nsec) after inverters 702 have been equalized and let float. This jump is amplified by inverter 702 of comparator 370 and the amplified output is fed to comparator 371 for further amplification. Similarly comparators 372–374 each supplies further amplification of the difference between VSENSE (or DELSET) with the analog version of the contents of holding register 110, and comparator 374 outputs a high if VSENSE (or DELSET) is greater than the contents of holding register 110 and outputs a low if VSENSE (or DELSET) is less than the contents of holding register 110. If the two intput are essentially equal, then noise may dominate and the output is random. This output of comparators 370–374 (after inversion by 355) is stored at the latch formed by inverters 356–357 during the high output pulse of one-shot 369 which makes transmission gate 363 conducting. This stored value appears inverted at output terminal 316. Lastly, at time t3 one-shot 369 falls low and this fires one-shot 368 which then drives NAND gate high and reapplies ground to inverter 702 inputs.

Thus once a sample (DELSET) is loaded into holding register 110 and the power-on-reset and power down (PD) signals are low, comparator 106 provides a comparison at every cycle of the 130 KHz signal, except when a new sample is being loaded into holding register 110 or as noted below.

Figure 18:
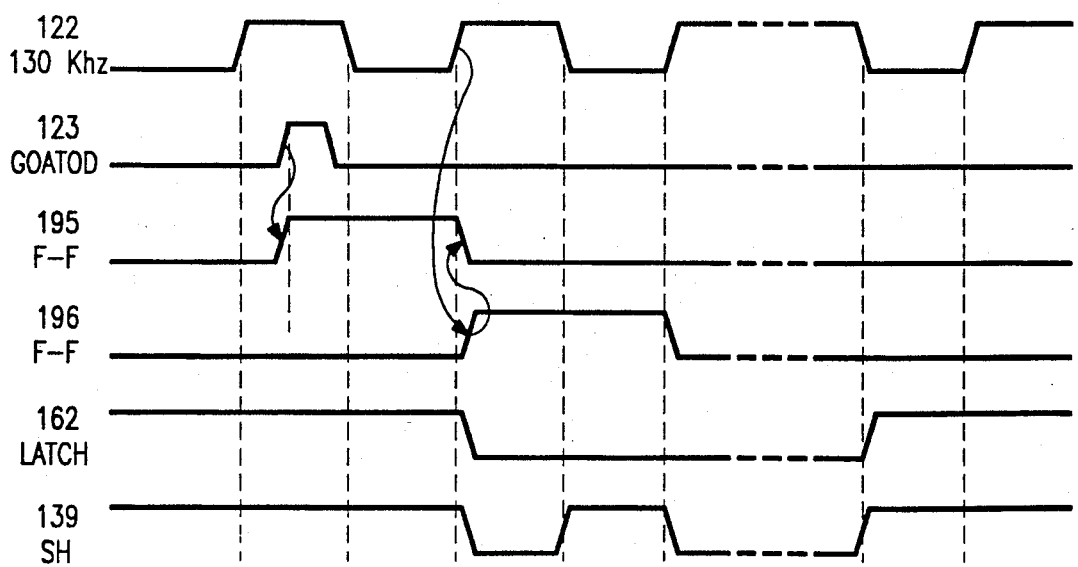
FIGS. 18 and 20 are timing diagrams for FIGS. 11 and 12.
Figure 19:
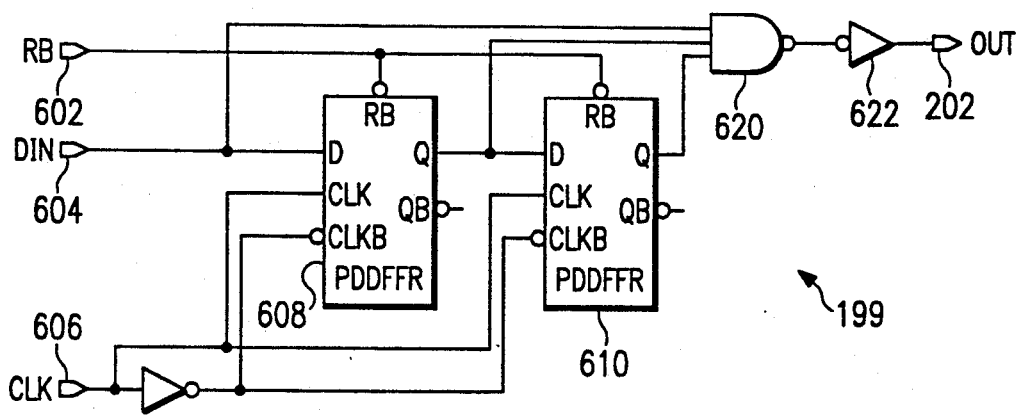

Next, presume a high pulse of duration 25 nsec is applied at terminal 123 (GOATOD). This will initiate the loading of a sample of about 80% of the loop current (DELSET) into holding register 110 for comparison to later samples of the loop current (VSENSE). Just prior to this pulse at terminal 123, flip-flop 195 (see FIG. 14) had a low signal at terminal 402 and a high signal at terminal 404, so transmission gate 420 was conductive and the high connected to terminal 406 had NAND gate 450 outputting a low. Recall that the not-reset input at terminal 408 is high due to the signals at terminals 124 (power-on-reset) and 125 (power down) and the output of NOR gate 163 are all being low. Transmission gates 422 and 424 break the feedback of inverter 440 to NAND gate 450 and isolate the feedback loop of inverter 434 to NAND gate 452, respectively. Once the high pulse appears at terminal 402 (and a complementary low at terminal 404), transmission gate 420 isolates the high at terminal 406 from NAND gate 450 and transmission gate 422 conducts inverter 440 feedsback to NAND gate 450 and thereby holds the output of NAND gate 450 low. This low is inverted by inverter 430 and passes through conducting transmission gate 424 to drive NAND gate 452 low and the output at terminal 410 high (that is, the Q=1 state for the flip-flop). Transmission gate 426 has broken the feedback of inverter 434 to NAND gate 452, so this change of state is not impeded. Once the high pulse passes and the signal on terminal 123 falls low, then the transmission gates in flip-flop 195 switch back to breaking the feedback loop of inverter 440 and NAND gate 450 and reestablishing the feedback loop of inverter 434 and NAND gate 452, but with a low output of NAND gate 452 (Q=1 state). When flip-flop 195 switches into the Q=1 state, this applies a high data input to flip-flop 196 which switches to a high output (Q=1) state during the high of the 130 KHz signal at terminal 122 which feeds to the clock input of flip-flop 196; see timing diagram FIG. 18. The high output of flip-flop 196 switches latch 162-163 into a state with the output of NOR gate 162 low and the output of NOR gate 163 high; the other external inputs to the NOR gates are low and do not deter the switch. This means that the output of inverter 141 goes high and releases the reset of the cells of shift register 118. Inverter 141 high also drives the output of gate 175 low and puts digital integrater 199 (see FIG. 19) into a reset low and so no loop current detection signal is output while a loading of a sample is in progress. Lastly, the high output of NOR gate 163 feeds back to NOR gate 161 and into flip-flop 195 to have reset both flip-flops within another 130 KHz cycle.

The loading of holding register 110 with a sample of DELSET proceeds as follows (still presuming that holding register 110 has been cleared zeros and shift register 118 has been cleared to all zeros except for the first cell). First, the rising edge of the output of inverter 139 (this occurs when the 130 KHz signal goes low, rcall FIG. 18) causes each cell of shift register 118 to shift the data at the input to the output, thus the first cell switches back to a Q=0 state, the second cell switches to a Q=1 state, and all of the other cells remain in the Q=0 state. This Q=1 state for the second cell of shift register 118 causes NAND gate 184 to have one low input (the complement of the second shift register cell state) and thus output a high to digital-to-analog converter 120 (see FIG. 13 wherein the inputs are labelled by corresponding connecting NAND gates). All other holding register cells and shift register cells are in Q=0 states, so all other inputs (185-191) of converter 120 are low. Thus the p-channel FET of inverter 501 is on, whereas the n-channel FET of inverters 502-508 are on. Each of the resistors labelled 2R (about 20 Kohms) have twice the resistance of each of the resistors labelled R (about 10 Kohms); so this a standard R-2R converter, and the output 510 is just ½ Vdd. Thus during the low half of the 130 KHz signal, comparators 370-374 first sample DELSET and then sample ½ Vdd, and output a high if DELSET is greater than or equal to ½ Vdd and output a low if DELSET is less than ½ Vdd. This comparator output appears at the data input to each of the cells of holding register 110, but is written only into the first cell because only its corresponding cell of shift register 118 is high. That is, NOR gate 164 outputs a write signal (high) only with two low inputs; one input is the complement of the corresponding shift register 118 cell and the other input is the output of inverter 139 (which is an inversion of the 130 KHz signal). Thus during the high portion of the 130 KHz signal the output of comparator 106 is written into the cell of holding register 110 that corresponds to the cell of shift register 118 that is in the Q=1 state. Thus the first cell contains the most significant bit of the digital version of DELSET as related to the voltage range of 0 to Vdd.

On the next falling edge of the 130 KHz signal, the high in the second cell of shift register 118 is shifted to the third cell, and the process of sample DELSET and compare to the analog converted contents of holding register 110 is repeated as just described. Note that with a Q=1 state in the first cell of holding register 110 (i.e., when DELSET is greater than or equal to ½ Vdd), the inputs to digital-to-analog converter 120 are a high at 184 due to the first cell of holding register 110, a high at 185 due to the high in the second cell of shift register 118, and 186-191 all lows. Thus in this case the output of comparators 370-374 is high if DELSET is greater than or equal to ¾ Vdd and low if DELSET is between ½ Vdd and ¾ Vdd. Again this output is written into the second cell of holding register 110 during the high portion of the 130 KHz signal, and this output is the second most significant bit of the digital version of DELSET. This process is repeated until all eight bits of the digital version of DELSET have been written into the eight cells of holding register 110. On the next falling edge of the 130 KHz signal (and rising edge of the output of inverter 139), the high of the ninth cell of shift register 118 shifts into the tenth cell, and this switches the output at terminal 201 high to indicate that the loading of a digitally converted sample of DELSET is complete One period of the 130 KHz signal later the high is shifted into the eleventh cell of shift register 118, and this applies a high through inverters 136 and 137 to the latch formed by NOR gates 162 and 163. This high switches the latch to a state with NOR gate 163 low and NOR gate 162 high. Hence, NAND gate 182 is driven high and stops the 130 KHz signal from clocking shift register 118 and resets the shift register by the high output of 162. Note that the holding register is not reset due to NOR gate 172 which also requires a high at either power-on-reset terminal 124 or a high at power down terminal 125.

A high signal on read terminal 126 permits reading the data stored in holding register 110 on 8-bit parallel port 203. In this manner a remote host can read the holding register contents.

The high in the tenth cell of shift register 118 also clocks flip-flop 197 which goes low if terminal 128 (the disable signal) has a high signal. Further, with a high on input terminal 130 (the off-hook signal) or on either of terminals 124 and 125, a reset signal is applied to 15 flip-flop 197 through NOR gate 174, and flip-flop 197 goes low. A Q=0 state of flip-flop 197 implies a high input to gate 175, and a low detection output signal at 202 regardless of the other inputs to gate 175. Similarly, a low output from comparator 106 (as when VSENSE is greater than the value held in holding register 110) implies a high input to gate 175 and a low detection output signal at 202. Lastly, a high output of inverter 141 (as is the case during the clocking of shift register 118) implies a high input to gate 175 and a low detection output signal at 202 thereby disabling a DLDET=1 output during conversion.

Contrarily, if the output of gate 175 is high, such as would be the case if comparator 106 sensed VSENSE to be less than the DELSET stored in holding register 110 and no disablers are active, then the input to digital integrater 199 is high, and if this stays high for two more periods of the 1 KHz clock at terminal 129, then the data input terminal 604 and flip-flops 608 and 610 will all be high and NAND gate 620 plus inverter 622 will provide a high output at terminal 202 to indicate that VSENSE has gone below DELSET. This use of a digitally stored DELSET permits accurate sensing and comparing of VSENSE (and thus telephone loop current) over a fairly long period of time. Furthermore, to account for drift in time and so forth, the stored value of DELSET can be purged and a new sample taken and stored for future comparisons.

A high signal at terminal 127 (resample) together with a high signal at terminal 128 (disable) push NAND gate 183 low and thus NAND gate 192 high to select VSENSE rather than DELSET in comparator 106. This is used to resample the value at VSENSE and place it into holding register 110 instead of DLTSET. This may be used, if desired, to monitor the value of VSENSE via software (by reading the contents of holding register 110).

Figure 22:
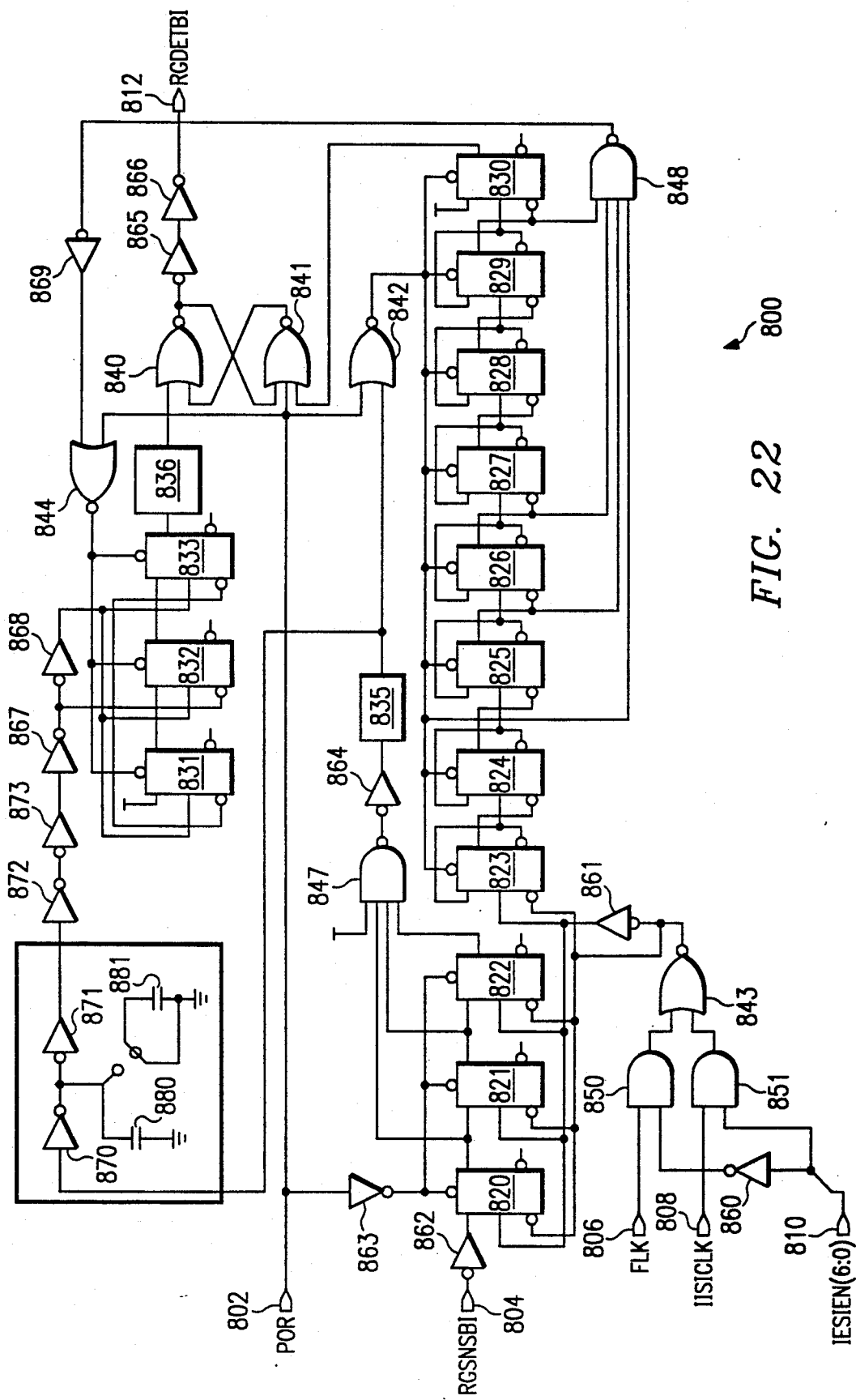
FIG. 22 is a schematic diagram of the preferred embodiment ring detector of the first preferred embodiment circuit.

FIG. 22 is a more detailed schematic diagram of ring detection circuit 800 indicated in FIGS. 1a, 4, and 10. As noted previously, detection circuit 800 is to detect a ring bursts on a telephone line that typically are 15 to 68 Hz pulse trains while discriminating against lower frequency signals, such as 10 Hz dialing pulses. Detection circuit 800 has input terminals 820 (power-on-reset), 804 (Ringsense from input buffer 803 of FIG. 10 which in turn is driven by the output of optocoupler 805 of FIG. 4), 806 (1 KHz sampling clock), and 808 and 810 for testing, output terminal 812, and includes flip-flops 820-833 each of which has the structure as shown in FIG. 14, high-going one-shots 835-836, NOR gates 840-844, NAND gate 847-848, AND gates 850-851, inverters 860-873, and capacitors 880-881.

Circuit 800 operates as follows. First presume that the inputs at test terminals 808 and 810 are low and the input at power-on-reset (POR) terminal 802 is high to reset the circuit. POR high is inverted by inverter 863 and resets flip-flops 820-822 to the Q=0 state; similarly, POR high drives nor gate 842 low and resets flip-flops 823-830 to the Q=0 state. Further, POR high also drives NOR gate 844 low and this resets flip-flops 831-833 to the Q=0 state. The low ouputs of reset flip-flops 820-822 sets NAND gate 847 high and thus inverter 864 low so one-shot 835 is quiescent. Similarly, the low output of reset flip-flop 833 keeps one-shot 836 quiet. Lastly, POR high drives NOR gate 841 low and this puts NOR gate 840 high due to the other gate input being the low output from on-shot 836. The high output of NOR gate 840 appears at output terminal 812 as a high signal RGDET\ indicating no ring signal sensed.

Conversely, when POR drops low, the flip-flops 820-833 are released from being held in the Q=0 state, and circuit 800 proceeds as follows. The input at 1 KHz clock terminal 806 passes through AND gate 850 and NOR gate 843 25 and inverter 861 to clock flip-flops 820-822 and also flip-flop 823. The input to flip-flop 820 is the Ringsense (inverted by 862) at terminal 804; so as long as Ringsense remains high (no ring signal to detect), a low is input to flip-flop 820 and it stays in the Q=0 state as do flip-flops 821-822 because they are driven by the output of flip-flops 820-821. Thus NAND gate 847 remains high and one-shot 835 remains inactive. Contrarily, the 1 KHz signal from inverter 861 clocks the counter made of flip-flops 823-830 as follows. Flip-flop 823 has its input tied to its QBar output and the 1 KHz signal applied to its clock input (and the complement of the 1 KHz signal applied to the clock complement input), thus flip-flop 823 outputs alternating highs and lows with twice the period (half the frequency) as the 1 KHz signal and synchronized with the low-to-high transitions of the 1 KHz signal. The output of flip-flop 823 feeds the inverted clock input of flip-flop 824 which also has its QBar output tied to its input. Thus flip-flop alternates highs and lows with twice the period as flip-flop 823 and synchronized with the low-to-high transitions. Similarly, flip-flop 825 has twice the period of flip-flop 824, flip-flop 826 has twice the period of flip-flop 825, and so forth. The net result is each flip-flop doubles the period (and divides the frequency by two) of the preceding flip-flop so that flip-flop 830 does not switch from low to high until the 1 KHz signal has clocked flip-flop 823 a total of 128 times. Also, the input to flip-flop 830 is a constant high, so once it switches to Q=1 it stays in that state until reset. Note that this clocking of counter 823-830 continues without regard for the Ringsense signal at terminal 804. However, the output of counter 823-830 feeding to NOR gate 841 has no effect if Ringsense continues high because the other two inputs are a low from POR and a high from NOR gate 840, and the outputs of counter 823-830 feeding NAND gate 848 drives it low after 76 cycles of the 1 KHz signal and keeps if low for 4 cycles, but this low from NAND gate 848 just switches inverter 869 high and NOR gate 844 low which applies a reset to flip-flops 831-833, but the flip-flops already are in the Q=0 state. Thus as long as the Ringsense input remains high nothing happens except for counter 823-830 clocking.

Now if Ringsense goes low at a time t0 (see timing diagram FIG. 23), then this implies that the input to flip-flop 820 goes high and on the next low-to-high transition of the 1 KHz signal the flip-flop goes into the Q=1 state and thereby inputs a high to flip-flop 821. Flip-flop 820 remains in Q=1 as long as the Ringsense input is low. Similarly, on the second next low-to-high of the 1 KHz signal flip-flop 821 goes into Q=1 and feeds a high intput to flip-flop 822. Again, flip-flop 821 remains in Q=1 as long as Ringsense remains low. Lastly, on the third next low-to-high of the 1 KHz signal flip-flop 822 switches to Q=1. Thus if Ringsense persists low for three cycles of the 1 KHz sampling signal, then the three flip-flops 820-822 are all in Q=1 and NAND gate 847 switches low. This requirement of three successive samples of Ringsense all being low in effect filters out spurious fluctuations from triggering the frequency measurement that follows.

NAND gate 847 switching low fires one-shot 835 (a 100 nsec pulse) and this both (1) resets all of the flip-flops of counter 823-830 to Q=0 by driving NOR gate 842 low and (2) clocks flip-flop 831 to Q=1 after a delay of about 20 nsec provided by inverter 870, capacitor 880 (or capacitor 881 for a delay of 30 nsec), and inverters 871, 872, 873, 867, and 868. Thus counter 823-830 begins counting from 0 at time t1, and two possibilities must be considered: (1) the Ringsense signal input at 804 has a frequency greater than about 13.3 Hz (a ring signal should be between 15 and 68 Hz), so time t2 when Ringsense goes high and time t3 when Ringsense goes back low are at most about 75 msec after time t1; and (2) the Ringsense input is less than 13.3 Hz, so time t2 and time t3 are at least 76 msec after time t1.

Figure 23:
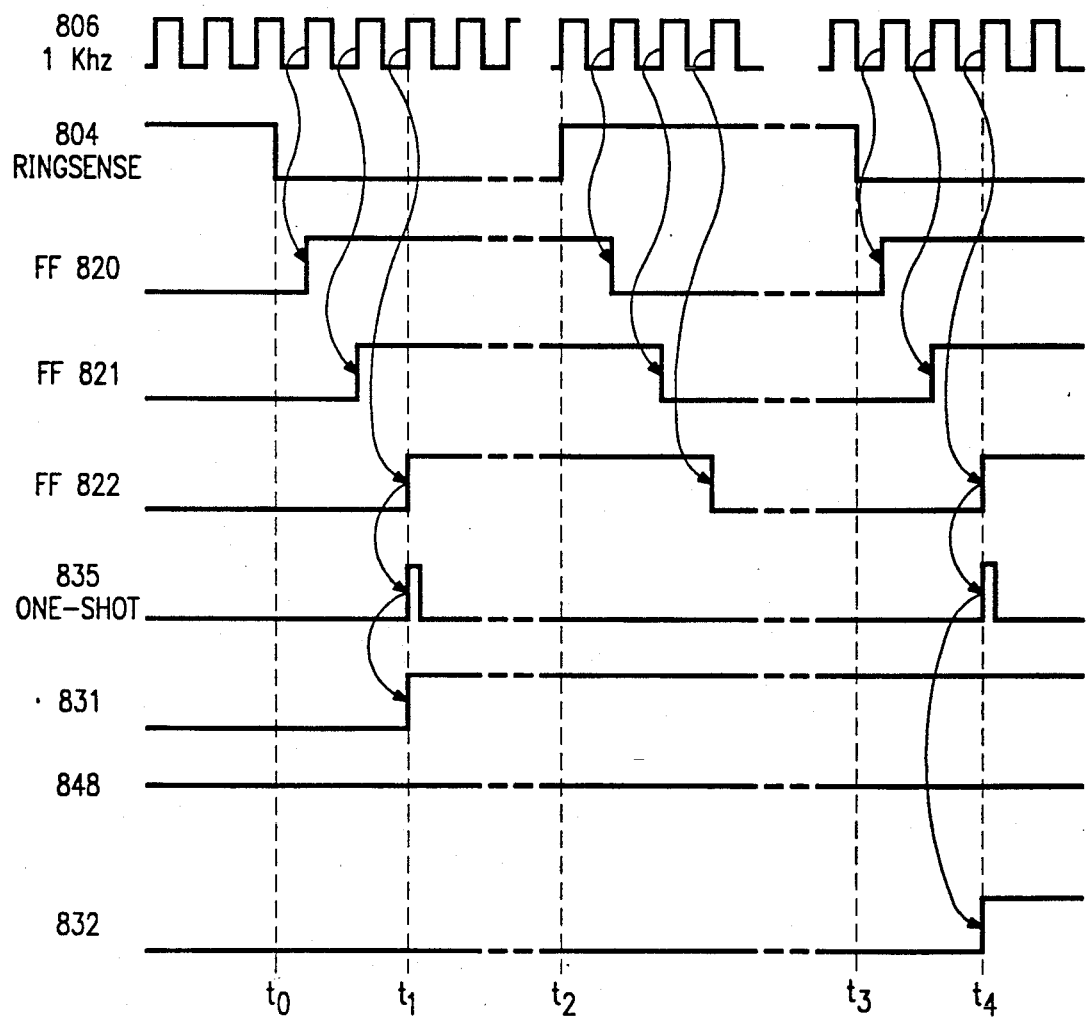
FIGS. 23-24 are timing diagrams for the preferred embodiment ring detector.

For case (1) the timing diagram of FIG. 23 applies and prior to the 76 cycles of the 1 KHz signal needed to switch flip-flop 830 to Q=1, one-shot 835 fires again at t4 and resets all of the flip-flops of counter 823–830 to the Q=0 state. One-shot 835 again provides a clocking pulse for flip-flops 831–833 (which is delayed by discharging capacitor 880 and inverters 870, 871, 872, 873, 867, and 868) and the high output of flip-flop 831 propagates into flip-flop 832 to switch it to Q=1 but flip-flop 833 remains at Q=0. Counter 823–830 begins again counting from 0 at time t4 and the process repeats provided Ringsense again goes high and then again low prior to counter 823–830 counting up to 76 cycles of the 1 KHz signal. After this repeat of the process, flip-flop 833 switches to Q=1 and this fires one-shot 836 which drives NOR gate 840 low and NOR gate 841 high (the other two inputs to gate 841 are both low) and thus makes the RGDET \ signal at terminal 812 low to indicate detection of a ring signal in Ringsense. Once Ringsense returns to a constant high, then counter 823–830 counts past 76 to 128 and flip-flop 830 goes high which drives NOR gate 841 back to low and NOR gate 840 back to high, so the RGDET \ output is again high indicating no ring signal.

Figure 24:
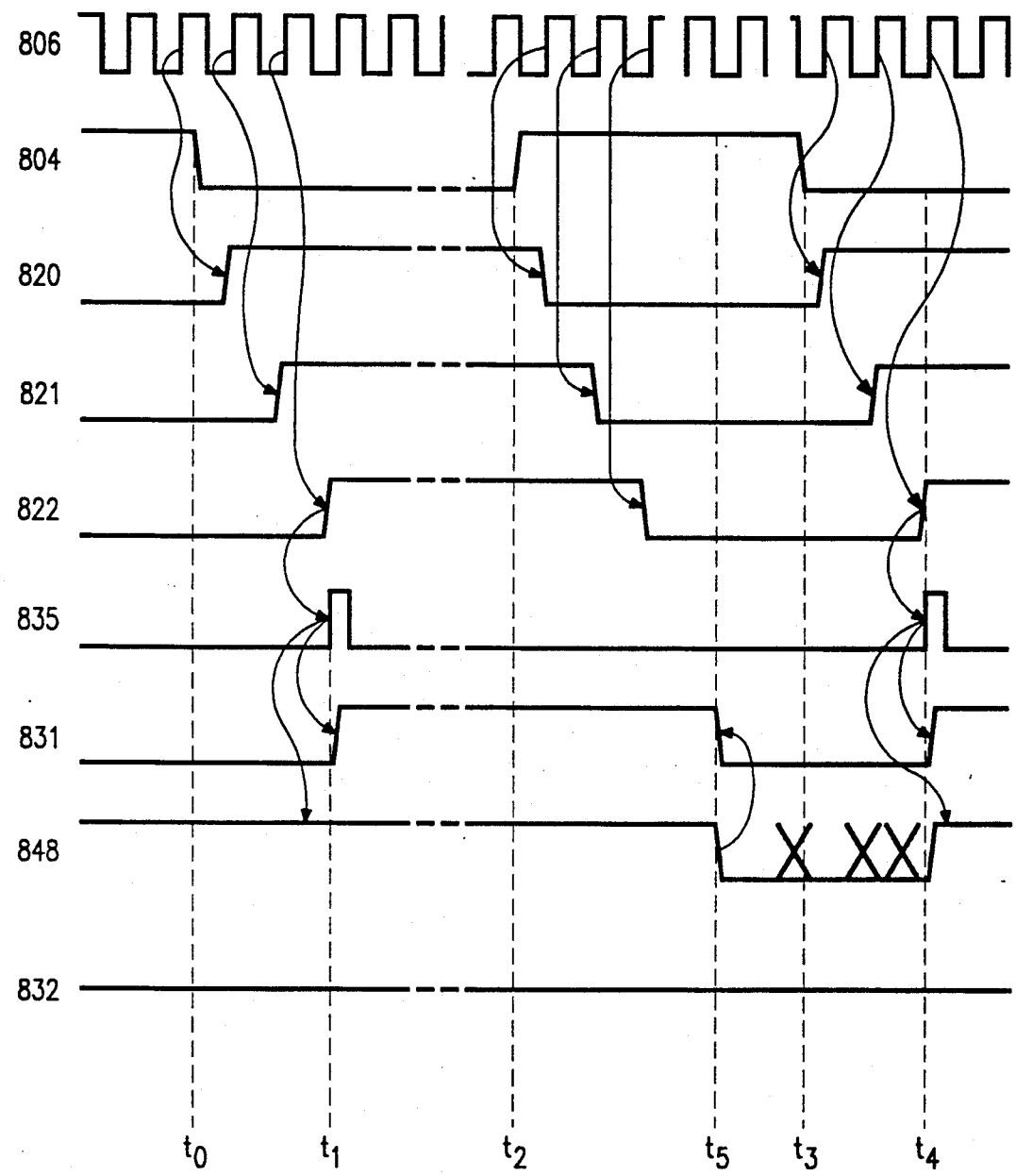

For case (2) the timing diagram of FIG. 24 applies and begins in manner similar to that of case (1), however, the lower frequency of Ringsense means that counter 823–830 counts to 76 at time t5 prior to one-shot 835 being fired for the second time at time t4 (and resetting the counter), and the counter output drives NAND gate 848 low which resets flip-flops 831–833 to Q=0, thus wiping out the Q=1 state of flip-flop 831. Thus the circuit is back to the condition it was at the time t1, and the cycle repeats with the counter counting from 0 but 76 again prior to one-shot 835 firing again and again the Q=1 state in flip-flop 831 is wiped out. Hence flip-flops 832 and 833 never go high and one-shot 836 remains quiet fails to switch the latch made of NOR gates 840–841 to indicate a ring signal. Note that the delay imposed by capacitor 880 (or 881) is necessary if counter 823–830 reaches 76 at t4, the time that one-shot 835 is to fire. This delay insures that the counter reset signal to flip-flops 831–833 is removed prior to one-shot 835 clocking them.

Note that the cutoff frqeuency at which circuit 800 detects can be adjusted by either varying the sampling frequency or by varying the counter's flip-flops that feed the reset gate 848 or both. Using three flip-flops 820–822 provides a filtering of each Ringsense input cycle and using three flip-flops 831-833 provides a filtering of the Ringsense frequency.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the loop current detector could have different numbers of bits in the digital-to-analog converter and corresponding changes in the shift register, the digital-to-analog converter could be a different type such as a voltage-scaling or charge-scaling converter, the number of cascaded comparators could be increased or decreased, or a different type of amplifier could be used.

What is claimed is:

1. An integrated circuit, comprising:
   (a) an input terminal for receiving a digital signal having a signal frequency;
   (b) an output terminal for indication of whether said signal frequency is greater than a cutoff frequency;
   (c) a storage cell coupled to said output terminal;
   (d) a counter counting at a sampling frequency;
   (e) first circuitry connected to said counter, said first circuitry outputting a reset signal to said storage cell when said counter contains the value N (a positive integer) but not when said counter contains any value in the range 0 to N-1, N is approximately equal to the quotient of said sampling frequency divided by said cutoff frequency;
   (f) second circuitry coupled to said input terminal, said second circuitry outputting a reset signal to said counter and a storage signal to said storage cell once each period of said digital signal;
   (g) said second circuitry includes a one-shot that is fired by the falling edge of said digital signal's pulses;
   (h) said falling edge of said digital signal's pulse is filtered by a series of flip-flops clocked at said sampling frequency prior to firing said one-shot;
   (i) whereby, said storage cell outputs a signal to said output terminal if and only if said signal frequency is greater than said cutoff frequency.

2. The integrated circuit of claim 1, wherein:
   (a) said storage cell is a series of flip-flops with a fixed input to the first in said series, said flip-flops clocked by said one-shot.

3. The integrated circuit of claim 1, wherein:
   (a) N is in the order of 76; and
   (b) said sampling frquency is about 1 KHz.

4. A frequency detector, comprising:
   (a) a digital signal input terminal;
   (b) a counter counting at a sampling frequency, said counter outputting a signal when the count reaches N, with N a predetermined positive integer;
   (c) a digital filter coupled between said input terminal and a reset input for said counter, a signal at said reset input changing the count of said counter to 0; and
   (d) an output terminal coupled to said counter and receiving said signal when the count reaches N;
   (e) whereby said output terminal will have a signal indicating a count of at least N if and only if a digital signal at said input terminal has a frequency less than said sampling frequency divided by N.

5. The detector of claim 4, wherein:
   (a) said filter comprises flip-flops in series and clocked at said sampling frequency.

6. The detector of claim 5, wherein:
   (a) said sampling frequency is about 1 KHz; and
   (b) N is about 76.

* * * * *